US012238304B2

(12) United States Patent
Francois et al.

(10) Patent No.: US 12,238,304 B2
(45) Date of Patent: Feb. 25, 2025

(54) CHROMA RESIDUAL SCALING FORESEEING A CORRECTIVE VALUE TO BE ADDED TO LUMA MAPPING SLOPE VALUES

(71) Applicant: INTERDIGITAL MADISON PATENT HOLDINGS, SAS, Paris (FR)

(72) Inventors: Edouard Francois, Bourg des Comptes (FR); Franck Galpin, Thorigne-Fouillard (FR); Karam Naser, Mouazé (FR); Philippe De Lagrange, Betton (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 79 days.

(21) Appl. No.: 17/760,702

(22) PCT Filed: Sep. 16, 2020

(86) PCT No.: PCT/EP2020/075841
§ 371 (c)(1),
(2) Date: Mar. 15, 2022

(87) PCT Pub. No.: WO2021/053002
PCT Pub. Date: Mar. 25, 2021

(65) Prior Publication Data

US 2022/0329829 A1 Oct. 13, 2022

(30) Foreign Application Priority Data

Sep. 17, 2019 (EP) .................................... 19306117
Sep. 23, 2019 (EP) .................................... 19306170
(Continued)

(51) Int. Cl.
*H04N 19/186* (2014.01)
*H04N 19/65* (2014.01)
(Continued)

(52) U.S. Cl.
CPC .......... *H04N 19/186* (2014.11); *H04N 19/65* (2014.11); *H04N 19/82* (2014.11); *H04N 19/36* (2014.11)

(58) Field of Classification Search
CPC ...... H04N 19/186; H04N 19/65; H04N 19/42; H04N 19/70; H04N 19/126; H04N 19/132
See application file for complete search history.

(56) References Cited

U.S. PATENT DOCUMENTS

2018/0124399 A1* 5/2018 Su ......................... H04N 19/30
2019/0320191 A1* 10/2019 Song ................... H04N 19/136
(Continued)

OTHER PUBLICATIONS

Francois et al., "AHG7 / AHG15 : Signalling of Corrective Values for Chroma Residual Scaling" Joint Video Experts Team (JVET) of ITU-T SG 16 WP3 and ISO/IEC JTC 1/SC 29/WG 11, Document: JVET-P0371_r1, 16th Meeting, Geneva, Switzerland, Oct. 1, 2019, 8 pages.

(Continued)

*Primary Examiner* — Richard T Torrente
(74) *Attorney, Agent, or Firm* — Condo Roccia Koptiw LLP

(57) ABSTRACT

At least a method and an apparatus are presented for efficiently encoding or decoding video. For example, one or more chroma residual scaling parameters are determined based one or more luma mapping parameters and based on a corrective value of the one or more chroma residual scaling parameters. The video is encoded or decoded based on the determined one or more chroma residual scaling parameters.

21 Claims, 11 Drawing Sheets

(30) Foreign Application Priority Data

| | | | |
|---|---|---|---|
| Oct. 4, 2019 | (EP) | .................................... | 19306288 |
| Oct. 10, 2019 | (EP) | .................................... | 19306324 |
| Oct. 10, 2019 | (EP) | .................................... | 19306325 |

(51) Int. Cl.
*H04N 19/82* (2014.01)
*H04N 19/36* (2014.01)

(56) References Cited

U.S. PATENT DOCUMENTS

2020/0389648 A1* 12/2020 Shingala .............. H04N 19/176
2022/0256174 A1* 8/2022 Zhao .................... H04N 19/184

OTHER PUBLICATIONS

Lu et al., "CE2.1.2: Luma-Chroma Dependency Reduction for LMCS", Joint Video Experts Team (JVET) of ITU-T SG 16 WP3 and ISO/IEC JTC 1/SC 29/WG 11, Document: JVET-O0098-v1, 15th Meeting, Gothenburg, Sweden, Jul. 3, 2019, 4 pages.
Bross et al., "Versatile Video Coding (Draft 6)", Joint Video Experts Team (JVET) of ITU-T SG 16 WP3 and ISO/IEC JTC 1/SC 29/WG 11, Document: JVET-O2002-vE, 15th Meeting: Gothenburg, Sweden, Jul. 3, 2019, 455 pages.
Lu et al., "CE12-2: HDR In-Loop Reshaping", Joint Video Experts Team (JVET) of ITU-T SG 16 WP3 and ISO/IEC JTC 1/SC 29/WG 11, Document: JVET-L0245-v2, 12th Meeting, Macao, China, Oct. 3, 2018, 18 pages.
Rusanovskyy et al., Additional Information on HDR Video Coding Technology Proposal by Qualcomm and Technicolor, Joint Video Experts Team (JVET) of ITU-T SG 16 WP 3 and ISO/IEC JTC 1/SC 29/WG, Document: JVET-J0067r1, 10th Meeting: San Diego, California, USA, Apr. 10, 2018, 10 pages.
Anonymous, "Reference Software for ITU-T H.265 High Efficiency Video Coding", Series H: Audiovisual and Multimedia Systems—Infrastructure of audiovisual services—Coding of Moving Video, Telecommunication Standarization Sector of ITU, Recommendation ITU-T H.265.2, Oct. 2014, 12 pages.
Rusanovskyy et al., "CE12 : Report of Dynamic Range Adaptation and DRA refinement", Joint Video Experts Team (JVET) of ITU-T SG 16 WP 3 and ISO/IEC JTC 1/SC 29/WG 11, Document: JVET-K0298, 11th Meeting: Ljubljana, Slovenia, Jul. 10, 2018, 8 pages.
Anonymous, "Transmission of Non-Telephone Signals: Information Technology—Generic Coding of Moving Pictures and Associated Audio Information: Systems", International Telecommunication Union, ITU-T Telecommunication Standardization Sector of ITU, Recommendation ITU-T H.222.0, Jul. 1995, 135 pages.
Lu et al., "CE12-2 : HDR In-Loop Reshaping (CE12-5, 12-6, 12-7, 12-8)", Joint Video Experts Team (JVET) of ITU-T SG 16 WP 3 and ISO/IEC JTC 1/SC 29/WG 11, Document: JVET-K0308-v1, 11th Meeting: Ljubljana, Slovenia, Jul. 10, 2018, 14 pages.
Anonymous, "Series H: Audiovisual and Multimedia Systems, Infrastructure of audiovisual services—Coding of moving video—Information Technology—Generic coding of moving pictures and associated audio information: Video", International Telecommunication Union, ITU-T Telecommunication Standardization Sector of ITU, Recommendation ITU-T H.262, Feb. 2000, 220 pages.

* cited by examiner

CHROMA RESIDUAL SCALING FORESEEING A CORRECTIVE VALUE TO BE ADDED TO LUMA MAPPING SLOPE VALUES

CROSS REFERENCE TO RELATED APPLICATIONS

This application is a U.S. National Stage Application under 35 U.S.C. 371 of International Patent Application No. PCT/EP2020/075841, filed Sep. 16, 2020, which is incorporated herein by reference in its entirety.

This application claims the benefit of European Patent Application Nos. 19306117.3, filed Sep. 17, 2019; 19306170.2 filed Sep. 23, 2019; 19306288.2, filed Oct. 4, 2019; 19306324.5, filed Oct. 10, 2019; and 19306325.2, filed Oct. 10, 2019, which are incorporated herein by reference in their entireties.

TECHNICAL FIELD

At least one of the present embodiments generally relates to a method or an apparatus for video encoding or decoding, and more particularly, to a method or an apparatus for efficiently providing chroma component residual scaling taking into account chroma quantization parameter (QP) derivation and/or luma mapping, for the video encoding or decoding.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

Recent additions to video compression technology include various industry standards, versions of the reference software and/or documentations such as Joint Exploration Model (JEM) and later VTM (Versatile Video Coding (VVC) Test Model) being developed by the JVET (Joint Video Exploration Team) group. The aim is to make further improvements to the existing HEVC (High Efficiency Video Coding) standard.

SUMMARY

The drawbacks and disadvantages of the prior art are solved and addressed by the general aspects described herein.

According to a first aspect, there is provided a method. The method comprises determining one or more chroma residual scaling parameters based one or more luma mapping parameters and based on a corrective value of the one or more chroma residual scaling parameters; and encoding the video based on the determined one or more chroma residual scaling parameters.

According to another aspect, there is provided another method. The method comprises determining one or more chroma residual scaling parameters based on one or more luma mapping parameters and based on a corrective value of the one or more chroma residual scaling parameters; and decoding the video based on the determined one or more chroma residual scaling parameters.

According to another aspect, there is provided an apparatus. The apparatus comprises one or more processors, wherein the one or more processors are configured to determine one or more chroma residual scaling parameters based on one or more luma mapping parameters and based on a corrective value of the one or more chroma residual scaling parameters; and encode the video based on the determined one or more chroma residual scaling parameters.

According to another aspect, there is provided another apparatus. The apparatus comprises one or more processors, wherein the one or more processors are configured to determine one or more chroma residual scaling parameters based one or more luma mapping parameters and based on a corrective value of the one or more chroma residual scaling parameters; and decode the video based on the determined one or more chroma residual scaling parameters.

According to another general aspect of at least one embodiment, the corrective value of the one or more chroma residual scaling parameters is determined based on a luma quantization parameter value.

According to another general aspect of at least one embodiment, the luma quantization parameter value is not dependent on another luma quantization parameter value used for collocated luma samples of a chroma block for which the one or more chroma residual scaling parameters are being determined.

According to another general aspect of at least one embodiment, the corrective value of the one or more chroma residual scaling parameters is based on an average value of selected luma samples.

According to another general aspect of at least one embodiment, the luma mapping parameters are representative of a slope of a luma forward mapping function applied to a prediction of luma samples.

According to another general aspect of at least one embodiment, the method further comprises signaling of said corrective value of the one or more chroma residual scaling parameters.

According to another general aspect of at least one embodiment, the corrective value of the one or more chroma residual scaling parameters is signaled as adaptive parameter in APS.

According to another general aspect of at least one embodiment, the corrective value of the one or more chroma residual scaling parameters is an additive value to be added to the luma mapping parameters resulting in corrected luma mapping slope values.

According to another general aspect of at least one embodiment, the chroma residual scaling parameters are derived by inverting the corrected luma mapping slope values.

According to another general aspect of at least one embodiment, the corrective value of the one or more chroma residual scaling parameters is in the range [−7, 7].

According to another general aspect of at least one embodiment, the corrected luma mapping slope values are bounded.

According to another general aspect of at least one embodiment, the corrected luma mapping slope values in the range (OrgCW>>3) to (OrgCW<<3-1), inclusive where OrgCW represents a neutral value of scaling.

According to a second aspect, there is provided a second method. The method comprises determining one or more chroma quantization parameters based on one or more chroma residual scaling parameters or on one or more luma mapping parameters; and encoding the video based on the determined one or more chroma quantization parameters.

According to another aspect, there is provided another method. The method determining one or more chroma quantization parameters based on one or more chroma residual scaling parameters or on one or more luma mapping parameters; and decoding the video based on the determined one or more chroma quantization parameters.

According to another aspect, there is provided an apparatus. The apparatus comprises one or more processors, wherein the one or more processors are configured to: determine one or more chroma quantization parameters based on one or more chroma residual scaling parameters or on one or more luma mapping parameters; and encode the video based on the determined one or more chroma quantization parameters.

According to another aspect, there is provided another apparatus. The apparatus comprises one or more processors, wherein the one or more processors are configured to: determine one or more chroma quantization parameters based on one or more chroma residual scaling parameters or on one or more luma mapping parameters; and decode the video based on the determined one or more chroma quantization parameters.

According to another general aspect of at least one embodiment, the method further comprises determining the one or more chroma residual scaling parameters based on luma mapping parameters.

According to another general aspect of at least one embodiment, the one or more processors of the apparatus are further configured to determine the one or more chroma residual scaling parameters based on luma mapping parameters.

According to another general aspect of at least one embodiment, the determining one or more chroma quantization parameters is based on one or more chroma residual scaling parameters comprises correcting a value of one of the one or more chroma quantization parameters based on a value of a chroma residual scaling factor.

According to another general aspect of at least one embodiment, the correcting is based on a slope of a mapping function.

According to another general aspect of at least one embodiment, the determining the one or more chroma residual scaling parameters is based on luma mapping comprises correcting a value of one of the one or more chroma residual scaling parameters based on a luma quantization parameter value.

According to another general aspect of at least one embodiment, the luma quantization parameter value is not dependent on another luma quantization parameter value used for collocated luma samples of a chroma block for which the one or more chroma residual scaling parameters are being determined.

According to another general aspect of at least one embodiment, the correcting a value of one of the one or more chroma residual scaling parameters is based on an average value of selected luma samples.

According to another general aspect of at least one embodiment, the luma mapping comprises applying a luma forward mapping function to prediction luma samples.

According to another general aspect of at least one embodiment the corrective chroma residual scaling parameters are bounded.

According to another general aspect of at least one embodiment the corrective chroma residual scaling parameters comprises one of an offset parameter and shrink parameter used in a linear function applied to the chroma mapping parameters.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of the video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

The general aspects described here are in the field of video compression. These aspects aim at improving compression and/or decompression efficiency compared to existing video compression systems.

Present embodiments relate to interactions between chroma residual scaling and chroma quantization parameter (QP) derivation. In a previous version of VTM, both tools are fully independent, but both have an impact on the chroma residual scaling. The present application discloses embodiments for taking into account the interaction between the chroma residual scaling and the chroma QP derivation.

Luma-Dependent Chroma Residual Scaling

Luma mapping with Chroma scaling (LMCS) is a tool of VVC specification JVET-02001. It includes two aspects: luma mapping (LM), and luma-dependent chroma residual scaling (sometime abbreviated as CS, or CRS as used in the current specification).

Luma mapping consists of applying a luma forward mapping function $Map_{fwd}(\cdot)$ to the prediction luma samples. The luma forward mapping function $Map_{fwd}(\cdot)$ is based on a table, lumaMap Table, coded in the data stream, in which lumaMap Table indicates the slopes of the piece-wise linear luma mapping function $Map_{two}(\cdot)$. Each piece or segment is of uniform length, defined for an interval $[Y_i, Y_{i+1}-1]$, i=0 to 15.

CRS is described, for instance, in contribution JVET-00098. CRS consists in using a luma-dependent scaling (in an encoder) or inverse scaling (in a decoder). The inverse scaling factors are derived from a table, chromaScaleTable, indexed by index values derived from luma values. The chromaScaleTable is deduced from lumaMapTable and can be approximated as chromaScaleTable [i]=1/lumaMap Table [i], for i=0 to 15. The scaling factors at the encoder side are the inverse of the inverse scaling factors used at the decoder.

Figure 1:
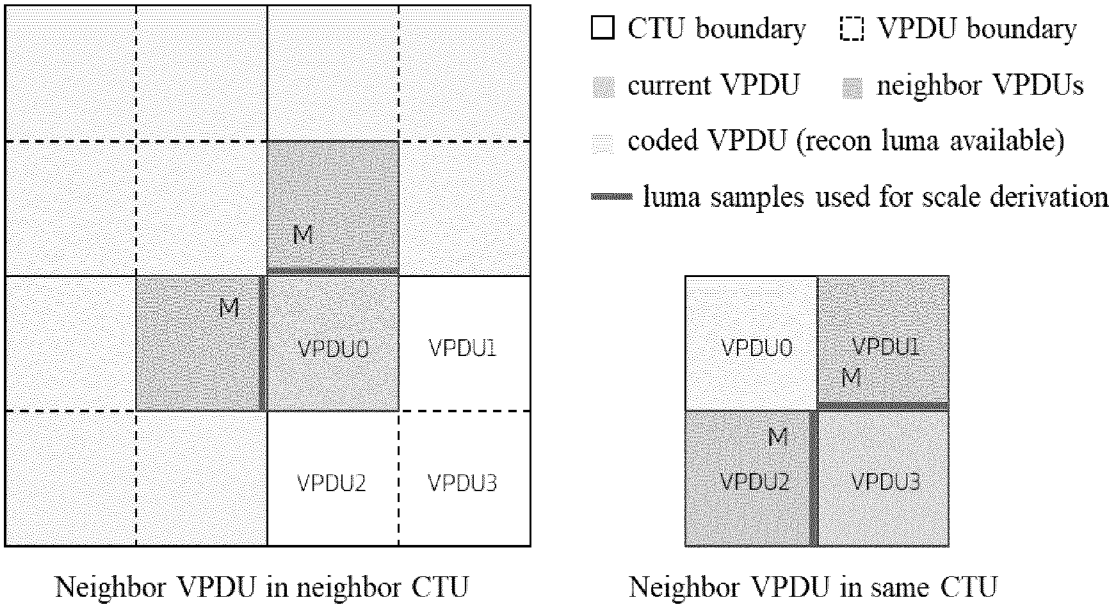
FIG. 1 shows Virtual Processing Decoding Unit (VPDU) neighboring samples used in chroma scaling factor derivation.

When processing a chroma block, a CRS factor for each 64×64 block (called Virtual Processing Decoding Unit-VPDU) is derived from luma sample values from previously reconstructed VPDU neighbors (see the illustration in FIG. 1). If the Coding Tree Unit (CTU) partition is inter 128×128, inter 128×64 and inter 64×128, then the CRS factor derived for the Coding Unit (CU) associated with the first VPDU is used for all chroma Transform Blocks (TBs) in that CU. For each VPDU, the left and top neighboring reconstructed luma samples are used.

First, the average value, avgY, of M left neighboring luma samples and M top neighboring luma samples which are the closest to the top-left position, as shown in FIG. 1 is calculated (with M=min (CTUSize, 64). Then the chroma scaling (at encoder) or inverse scaling (at decoder) factor is derived from the chroma scaling table based on avgY.

From avgY, the index idx in the chroma scaling table is computed. The avgY is derived from luma values that are in the forward mapped domain. Therefore, the index idx is computed as the value such that avgY belongs to the interval $[Map_{fwd}(Y_{idx}), Map_{fwd}(Y_{idx+1}-1)]$. The chroma prediction residual samples for all the chroma blocks in this VPDU are scaled by the scaling factor scale=(1/chromaScaleTable [idx]) (at encoder) or inverse scaled by the scaling factor invScale=chromaScaleTable [idx] (at decoder).

On the picture boundary, for the rightmost column VPDU, if the upper neighboring samples within the picture is less than M, the picture boundary sample is padded until M. For the bottom row VPDU, if the left neighboring samples within the picture is less than M, the picture boundary samples is padded until M. For the leftmost column VPDU, only M top neighboring samples are used for average value. For the top row VPDU, only M left neighboring samples are used for average value. For the left-top VPDU of the picture, avgY is directly set as 1<<(bitdepth−1).

Encoder

Figure 3:
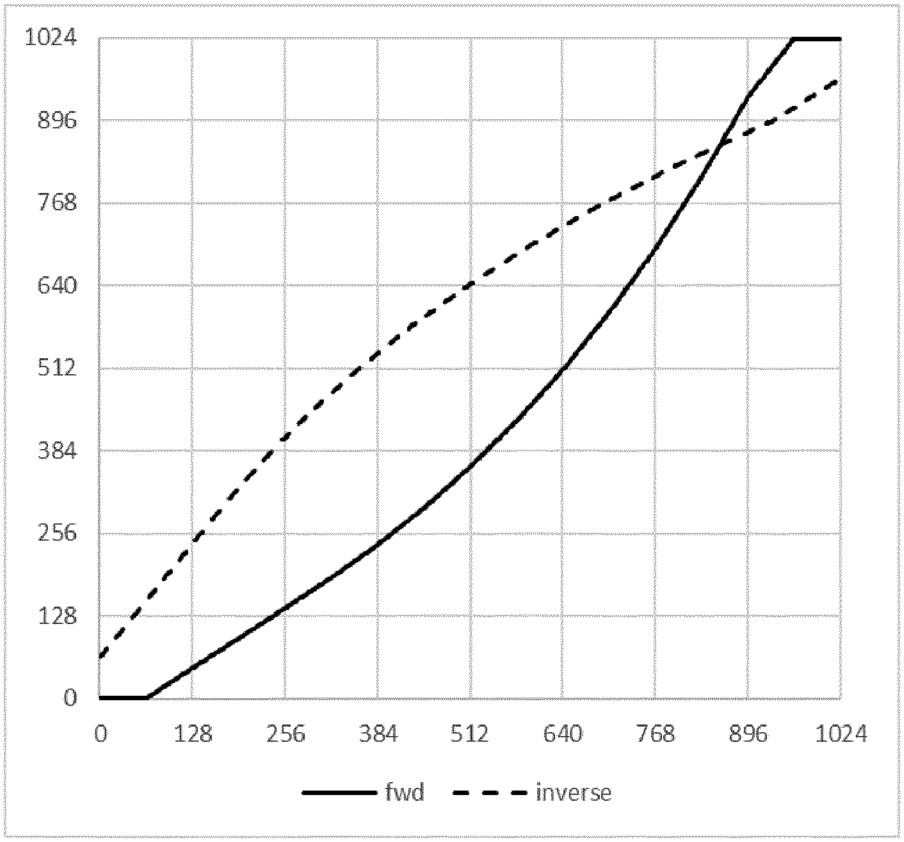
FIG. 3 illustrates an example of a luma forward mapping function and of the inverse mapping function.
Figure 6:
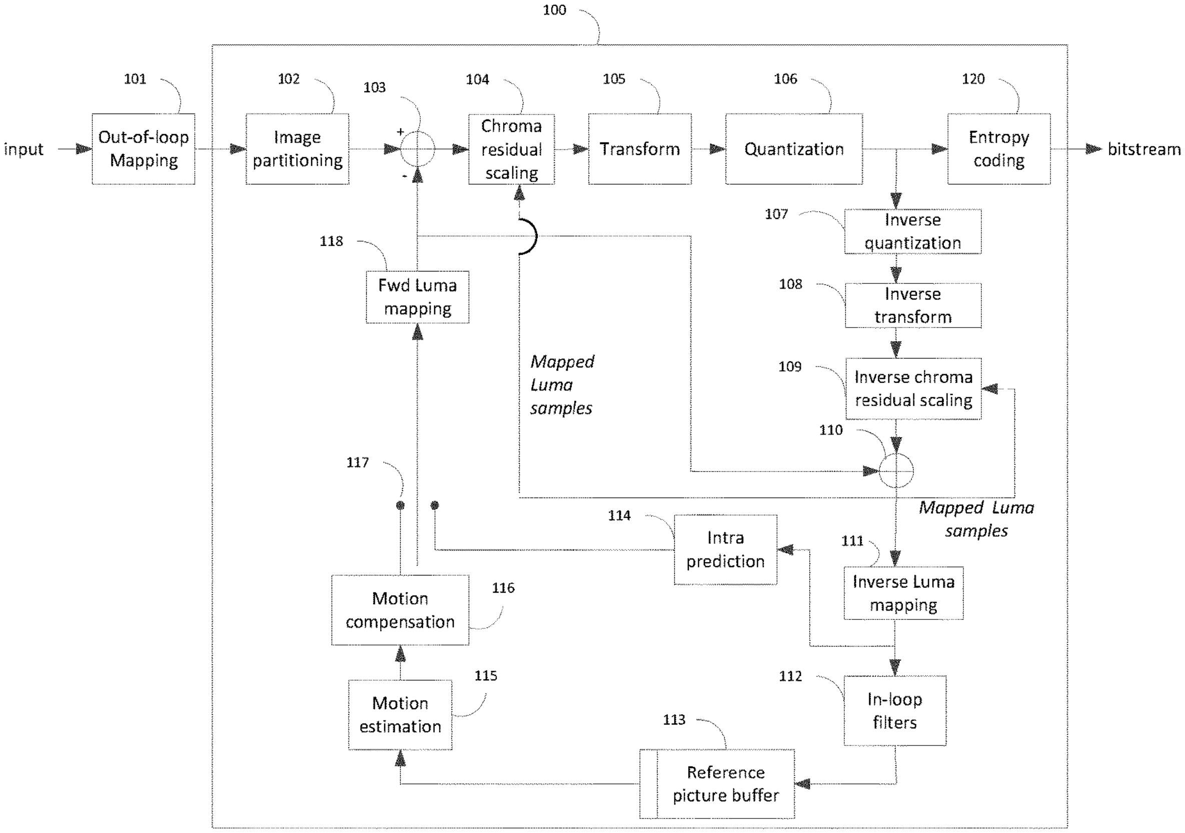
FIG. 6 illustrates an example of a video encoder in which various aspects of the embodiments may be implemented.

FIG. 6 illustrates an example of a VVC encoder (100). An uncompressed video signal is received and used as an input to a mapping function (101). The mapping function may be, e.g., as described above, to be further described, and/or as shown in FIG. 3. The mapped signal is then partitioned at 102. CRS corresponds to block 104. The scaling factor applied in 104 is based on reconstructed mapped luma samples. CRS applies to the chroma residual signal obtained in 103 from the substraction of the chroma prediction to the input chroma samples, possibly processed by an out-of-loop mapping (101). The result after the CRS processing in 104, is the scaled chroma residual signal.

The scaled chroma residual signal is then processed by a transform (105) and quantization (106), and the resulting signal is coded in the entropy coding (120). This signal is also processed by inverse quantization (107) and inverse transform (108) to produce the decoded chroma residual. An inverse CRS is applied in 109 to the decoded chroma residual signal. The inverse scaling factor applied in 109 is based on reconstructed mapped luma samples. The inverse scaled decoded chroma residual signal is then added in an adder (110) to the prediction chroma signal resulting from either the intra prediction (114) or from the motion estimation (115) and motion compensation (116), depending on the mode selection (intra or inter prediction) made at 117. The resulting signal is processed by in-loop filters (112) and the resulting signal is stored in the reference picture buffer (113).

Decoder

Figure 7:
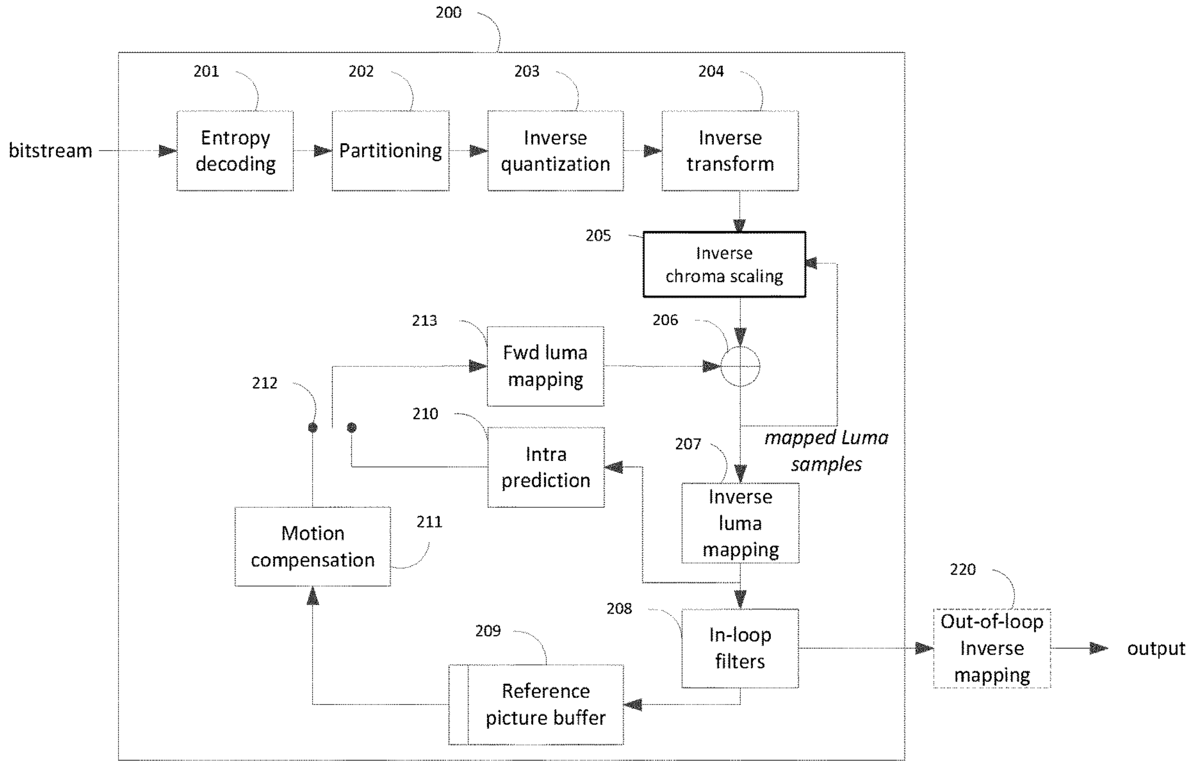
FIG. 7 illustrates an example of a video decoder in which various aspects of the embodiments may be implemented.

FIG. 7 illustrates an example of a VVC decoder (200). A received bitstream (e.g., from an encoder 100 in FIG. 6) is first entropy decoded (201) and partitioned (202). The inverse CRS (205) is applied to the decoded chroma residual samples resulting from the inverse quantization (203) and inverse transform (204) of the decoded chroma coefficients. The inverse scaling factor applied in 205 is based on reconstructed mapped luma samples. The decoded chroma residual samples are then added in 206 to the prediction signal resulting either from the intra prediction (210) or from the motion compensation (211) depending on the coding mode selection (212). The resulting reconstructed chroma signal is then processed by the in-loop filtering (208) and the resulting signal is stored in the reference picture buffer (209). The signal from the in-loop filtering (208) may be additionally processed by an out-of-loop inverse mapping (220) to produce a decoced output.

Figure 2:
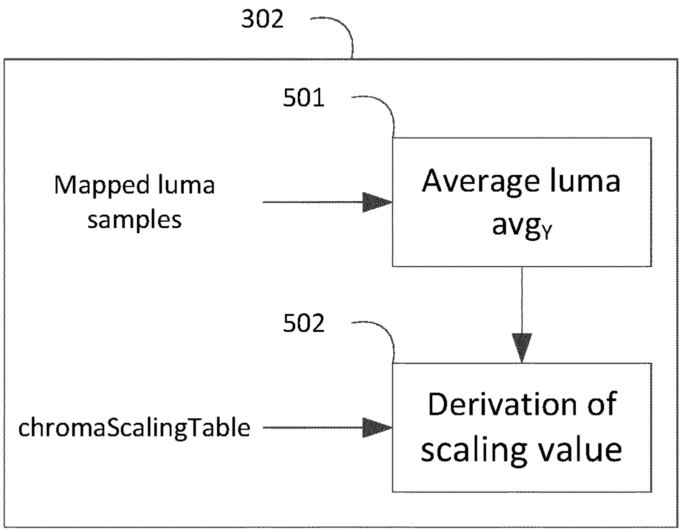
FIG. 2 illustrates an example of chroma scaling derivation.

An example of chroma inverse scaling value derivation process 302 is illustrated in FIG. 2. Process 302 is made of the following steps:

Step 501: derivation of a representative luma value, avgY, from mapped reconstructed (or, in some implementations, prediction) luma samples in the borders of the VDPU containing the chroma block being processed.

Step 502: derivation of the inverse scaling factor from avgY and from the chroma scaling table chromaScaleTable.

An example of lumaMapTable is given in Table 1 below. The table corresponds to the slope values of the forward mapping function $Map_{fwd}(\cdot)$, defined from index 0 to 15. For 10-bit signal, one index range corresponds to 64 luma values range (1024/16). The values are scaled by 64 (which means that 64 is equivalent to a slope value of 1), as shown in "normalized slope" row in Table 1.

TABLE 1

| Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Y range | 0-63 | 63-127 | 128-191 | 192-255 | 256-319 | 320-383 | 384-447 | 448-511 | 512-575 | 576-639 | 640-703 | 704-767 | 768-831 | 832-895 | 896-959 | 960-1023 |
| Coded Slope | 0 | 47 | 46 | 47 | 47 | 51 | 57 | 64 | 71 | 79 | 89 | 99 | 111 | 124 | 91 | 0 |
| normalized Slope | 0.00 | 0.73 | 0.72 | 0.73 | 0.73 | 0.80 | 0.89 | 1.00 | 1.11 | 1.23 | 1.39 | 1.55 | 1.73 | 1.94 | 1.42 | 0.00 |

The corresponding luma mapping function $Map_{fwd}(\cdot)$ is illustrated in FIG. 3. Its inverse approximation, $invMap_{fwd}(\cdot)$ is also shown in dashed lines.

An example of the related chromaScaleTable (corresponding to inverse chroma scaling values) is given below. The values are scaled by 2048 (which means that 2048 is equivalent to a scale of 1).

In the most recent VVC implementation, chromaScale Table [k]≈(2048/(lumaMap Table [k]/64)) (except when lumaMapTable [k]=0, in which case chromaScaleTable [k] is set to 2048), as shown in Table 2 below.

TABLE 2

| index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Coded value | 2048 | 2788 | 2849 | 2788 | 2788 | 2570 | 2299 | 2048 | 1846 | 1659 | 1472 | 1323 | 1180 | 1057 | 1440 | 2048 |
| Normalized value | 1.00 | 1.36 | 1.39 | 1.36 | 1.36 | 1.25 | 1.12 | 1.00 | 0.90 | 0.81 | 0.72 | 0.65 | 0.58 | 0.52 | 0.70 | 1.00 |

In the following description, it will be considered that lumaMap Table and chromaScale Table are made of normalized, floating-point values. It is straightforward to generalize the concepts discussed below for values represented in integer/fixed-point.

Chroma QP Value Derivation from Luma QP Value

In VVC, the chroma QP value is derived from the luma QP value and from QP offset parameters, using chroma QP mapping tables. In latest VVC specification JVET-02001, the chroma QP mapping tables are signalled in the bitstream at the SPS level, as illustrated in underlined portions of the syntax table, Table 3, below. The relevant semantics of the syntax elements are also provided below.

TABLE 3

| | Descriptor |
|---|---|
| seq_parameter_set_rbsp( ) { | |
| ... | |
| } | |
| if( ChromaArravType !=0 ) { | |
| same_qp_table_for_chroma | u(1) |
| for( i = 0; i < same_qp_table_for_chroma ? 1 : 3; i++ ) { | |
| num_points_in_qp_table_minus1[ i ] | ue(v) |
| for( i = 0; i <= num_points_in_qp_table_minus1[ i ]; j++) { | |
| delta_qp_in_val_minus1[ i ][ j ] | ue(v) |
| delta_qp_out_val[ i ][ j ] | ue(v) |
| } | |
| } | |
| } | |
| ... | |

An example of related semantics is as follows:

same_qp_table_for_chroma equal to 1 specifies that only one chroma QP mapping table is signalled and this table applies to Cb and Cr residuals as well as joint Cb-Cr residuals.

same_qp_table_for_chroma equal to 0 specifies that three chroma QP mapping tables are signalled in the SPS. When same_qp_table_for_chroma is not present in the bistream, the value of same_qp_table_for_chroma is inferred to be equal to 1.

num_points_in_qp_table_minus1 [i] plus 1 specifies the number of points used to describe the i-th chroma QP mapping table. The value of num_points_in_qp_table_minus1 [i] shall be in the range of 0 to 63+QpBdOffsetc, inclusive. When num_points_in_qp_table_minus1 [0] is not present in the bitstream, the value of num_points_in_qp_table_minus1 [0] is inferred to be equal to 0.

delta_qp_in_val_minus1 [i] [j] specifies a delta value used to derive the input coordinate of the j-th pivot point of the i-th chroma QP mapping table. When delta_qp_in_val_minus1 [0] [j] is not present in the bitstream, the value of delta_qp_in_val_minus1 [0] [j] is inferred to be equal to 0.

delta_qp_out_val [i] [j] specifies a delta value used to derive the output coordinate of the j-th pivot point of the i-th chroma QP mapping table. When delta_qp_out_val [0] [j] is not present in the bitstream, the value of delta_qo_out_val [0] [j] is inferred to be equal to 0.

The i-th chroma QP mapping table ChromaQpTable [i] for i=0 . . . same_qp_table_for_chroma? 0:2 is derived as follows:

qpInVal[i] [0]=-QpBdOffsetc+delta_qp_in_val_minus1 [i] [0]
qpOutVal[i] [0]=-QpBdOffsetc+delta_qp_out_val [i] [0]
for (j=1; j<=num_points_in_qp_table_minus1 [i]; j++) {
  qpInVal [i] [j]=qpInVal [i] [j-1]+delta_qp_in_val_minus1 [i] [j]+1
  qpOutVal[i] [j]=qpOutVal[i] [j-1]+delta_qp_out_val [i] [j]
}
ChromaQp Table [i] [qpInVal [i] [0]]=qpOutVal[i] [0]
for (k=qpInVal [i] [0]-1; k>=-QpBdOffsetc; k--)
  ChromaQpTable [i] [k]=Clip3 (-QpBdOffsetc, 63, ChromaQpTable [i] [k+1]-1) (7-31)
for (j=0; j<num_points_in_qp_table_minus1 [i];j+) {
  sh=(delta_qp_in_val_minus1 [i]+1]+2)>1'
  for (k=qpinVal[i] [j]+1, m=1; k<=qplnval[i] [j+1]; k+, m+)

ChromaQp Table [i] [k]=ChromaQpTable [i] [qplnVal [i] [j]]+ (delta_qp_out_val [i]+1] *m+sh)/(delta_qp_in_val_minus1 [i]]+1]+1)

} for (k=qplnVal [i] [num_points_in_qp_table_minus1 [i]]+1; k<=63; k++)

ChromaQpTable [i] [k]=Clip3 (-QpBdOffsetc, 63, ChromaQpTable [i] [k-1]+1)

When same_qp_table_for_chroma is equal to 1, ChromaQpTable [1] [k] and ChromaQpTable [2] [k] are set equal to ChromaQpTable [0] [k] for k=-QpBdOffsetc . . . 63.

It is a requirement of bitstream conformance that the values of qpinVal[i] [j] and qpOutVal[i] [j] shall be in the range of -QpBdOffsetc to 63, inclusive for i=0 . . . same_qp_table_for_chroma? 0:2 and j=0 . . . num_points_in_qp_table_minus1 [i].

Three types of chroma residual are considered in VVC: i) Cb residual (defined by a chroma index cldx equals to 1), ii) Cr residual (defined by a chroma index cldx equals to 2), iii) joint Cb-Cr residual (defined by a chroma index cldx equals to 3). The joint Cb-Cr residual is used when the joint Cb-Cr coding mode is applied to the chroma block. When joint Cb-Cr residual is not applied to the chroma block, both Cb residual and Cr residuals exist. Three chroma QP mapping tables are therefore considered in VVC, that are noted here: ChromaQpTable [0] (for Cb, cldx=1), ChromaQpTable [1] (for Cr, cldx=2) and ChromaQpTable [2] (for joint Cb-Cr, cldx=3).

In the syntax, it is possible to signal the same syntax elements for the three tables (when same_qp_table_for_chroma equals 1) or to signal specific syntax elements for each of the three chroma QP mapping tables (when same_qp_table_for_chroma equals 0, which indicates that 3 sets of syntax elements are signaled, one set per chroma QP mapping table).

For a given chroma block of a given chroma index cldx, the chroma QP $QPC_{cldx}$ is computed as follows (e.g., see section "Derivation process for quantization parameters" of JVET-O2001).

Luma and chroma QPs are derived per area called quantization groups (QGs). This process applies to elements 106 and 107 of the encoder 100 of FIG. 6 and element 203 of the decoder 200 of FIG. 7.

Figure 4:
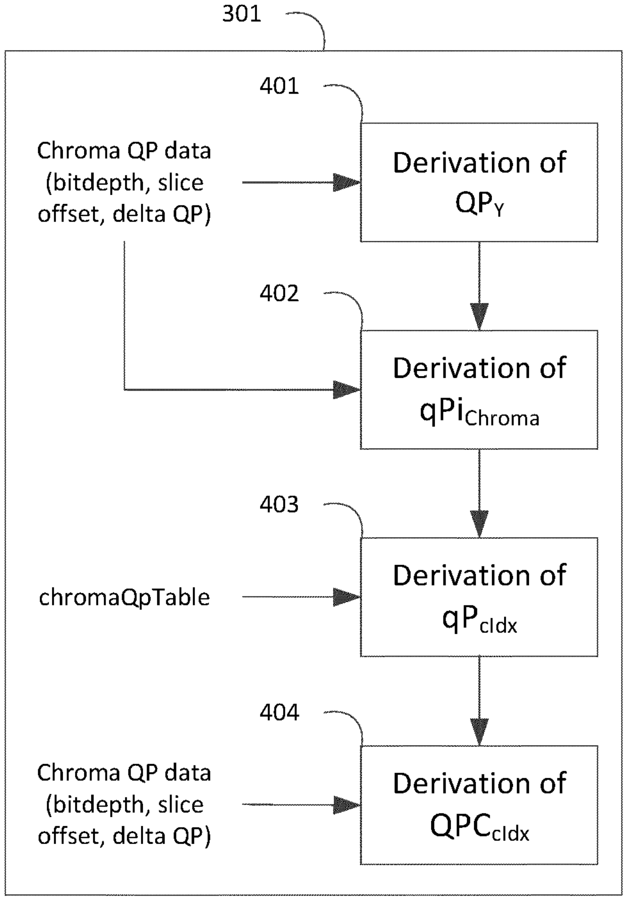
FIG. 4 illustrates an example of chroma QP derivation.

The chroma QP, $QPC_{cldx}$, derivation process 301 is illustrated in FIG. 4. The process 301 comprises the following:

Step 401: a parameter QFY is first derived from the luma QP of the slice, or from the luma QP of neighboring blocks. More precisely, the following detailed steps are applied:

qPY_PREV is set to the slice luma QP SliceQpy (in top-left border of slice, tile or brick), or to the luma QP of the last luma CU in the previous QG in decoding order qPY_A is set to qPY_PREV (in left border of QG), or to the Qpy of the current QG (inside the QG)

qPY_B is set to qPY_PREV (in top border of QG), or to the QPY of the current QG (inside the QG)

qPY_PRED is set to the luma quantization parameter Qpy of the coding unit containing the luma coding block covering the left quantization group, or to $(qP_{Y\_A}+qP_{Y\_B}+1)>>1$ QpY=((qPY_PRED+CuQpDeltaVal+64+2*QpBdOffsety) % (64+QpBdOffsety))-QpBdOffs ety Step 402: Then an intermediate value is derived as a clipped value of QpY $qPi_{chroma}$=Clip3 (-QpBdOffsetc, 63, QpY)

Step 403: an intermediate chroma QP $qP_{cldx}$ using the chroma QP mapping tables is computed as:

$qP_{cldx}$=ChromaQpTable [cldx-1] [$qPi_{Chroma}$]

Step 404: finally, the chromna QP $QPC_{cldx}$ is computed as:

$QPC_{cldx}$=Clip3 (-QpBdOffsetc, 63, $qP_{cldx}$+pps_cb_qp_offset+slice_cb_qp_offset+CuQp Offset$_{co}$)+QpBcOffsetc where CuQpDeltaVal is the coded delta QP for the CU, QpBdOffsety and QpBdOffsetc are parameters depending on the luma and chroma signal bitdepth, respectively.

An example of chromaQpTable is given in Table 4 below:

TABLE 4

| | | | | | | | | | | | | | | | | |
|---|---|---|---|---|---|---|---|---|---|---|---|---|---|---|---|---|
| qPiChroma | <30 | 30 | 31 | 32 | 33 | 34 | 35 | 36 | 37 | 38 | 39 | 40 | 41 | 42 | 43 | >43 |
| qPcldx | =qPi | 29 | 30 | 31 | 32 | 33 | 33 | 34 | 34 | 35 | 35 | 36 | 36 | 37 | 37 | = qPi −6 |

Interaction-Inverse Quantization/Inverse Scaling

Figure 5:
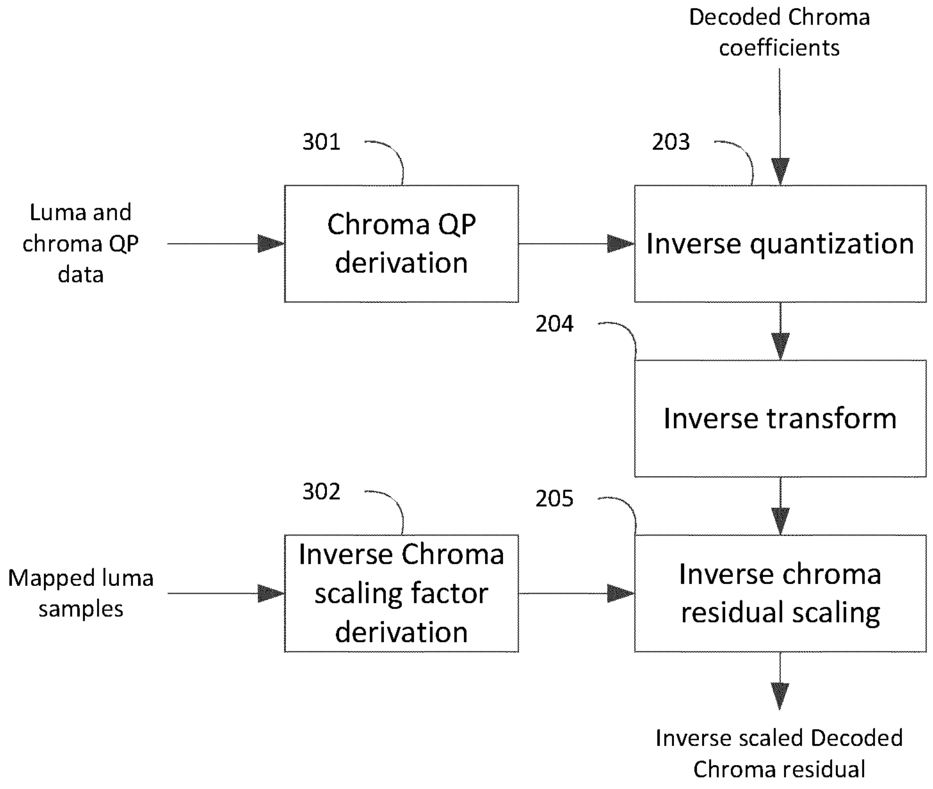
FIG. 5 illustrates an example of inverse quantization and inverse scaling of chroma residual.

FIG. 5 depicts a simplified block diagram of the chroma residual inverse quantization and inverse scaling of a chroma component of index cldx. First, the chroma QP, $QPC_{cldx}$, is derived (301) from luma and chroma QP data obtained from the entropy decoding and from the decoding of previously decoded CUs. The decoded chroma coefficients are inverse quantized in 203 using the chroma QP, $QPC_{cldx}$. The inverse quantized coefficients are then inverse transformed (204). Step 302 derives the inverse chroma scaling value from mapped luma samples neighboring the current VPDU (302). The inverse CRS applies to the chroma residual resulting from the inverse transform, in step 205, with the inverse scaling value as input. The output of this process is the inverse scaled decoded chroma residual.

At least one of the present embodiments relates to the interaction between the chroma residual scaling and the chroma QP derivation. In a previous version of VTM, both tools are fully independent, but both have an impact on the chroma residual scaling. At least one of the present embodiments defines a process for taking into account the interaction between the chroma residual scaling and the chroma QP derivation.

The chroma QP is currently derived from luma QP information, QPY, deduced from the slice level, or luma coding blocks neighboring, or inside the luma area covering chroma block.

However, the luma samples are processed by a forward luma mapping (118 in encoder 100 of FIG. 6, or 213 in decoder 200) derived from a luma mapping table, lumaMapTable. This process of mapping is in a way similar to a quantization of the luma samples. However, this additional quantization of luma samples is not taken into account in the process of deriving the chroma QP value. This may result in wrong luma/chroma bitrate balance or luma/chroma quality balance.

At least one of the present embodiments aims at solving these issues and making improvements by taking into account the interaction between, e.g., the luma mapping, the chroma residual scaling and the chroma QP derivation.

It is possible to limit the impact of the problem discussed above by adjusting the local chroma QP, using delta chroma QP coding. However, this solution requires spending additional bits for coding the delta chroma QP coding and may therefore penalize the coding efficiency. Also, the accuracy of the scaling achieved with the delta chroma QP (step 203) may be not high enough, compared to the accuracy of the chroma residual scaling (step 205).

In JVET-J0067, another investigated solution consists in modifying the chroma residual scaling factor based on the value of the QP used for the collocated luma samples of the chroma samples. This solution creates a dependency on the luma QP of collocated luma samples, which can be problematic for implementation throughput.

Accordingly, at least one of the present embodiments consists in adjusting the chroma residual scaling factor based on the chroma QP table and luma QP parameters. Present exemplary embodiments comprise:

1. modifying the chroma QP derivation process by taking into account the mapping applied to luma samples or the scaling that will be applied in the further chroma residual scaling; and/or
2. modifying the chroma residual scaling process by taking into account the bias induced by the luma mapping applied to the luma samples used for computing the chroma scaling factor, but without having a dependency with the QP used for the collocated luma samples of the chroma block.

Advantages of the proposed embodiments include gaining a better luma-chroma quality balance.

Steps for Inverse Quantization and Inverse Chroma Residual Scaling in a Previous Version of VVC The inverse quantization and inverse chroma residual scaling processes in a previous version of VVC specification are achieved by the following:

Step 301 (e.g., as shown in FIG. 4)
Step 401: derivation of QpY
Step 402: derivation of $qPi_{Chroma}$
  $qPi_{Chroma}$=Clip3 (-QpBdOffsetc, 63, Qpr)
Step 403: derivation of $qP_{cldx}$
  $qP_{cldx}$=ChromaQp Table [cldx-1] [$qPi_{Chroma}$]
Step 404: derivation of $QFC_{cldx}$
  $QPC_{cldx}$=Clip3 (-QpBdOffsetc, 63, qP cldx +pps_cb_qp_offset+slice_cb_qp_offset+CuQpOffsetcb)+QpBdOffsetc
Step 302 (e.g., as shown in FIG. 2)
Step 501: derivation of avgY
Step 502: derivation invScale
  invScale=chromaScale Table [idx (avgY)]

where the function idx (Y) returns the index of the segment [$Map_{fwd}$ (Y), $Map_{fwd}$ (Yi+1)-1] containing Y.

Embodiments—Correction Applied when Deriving the Chroma QP

Figure 8:
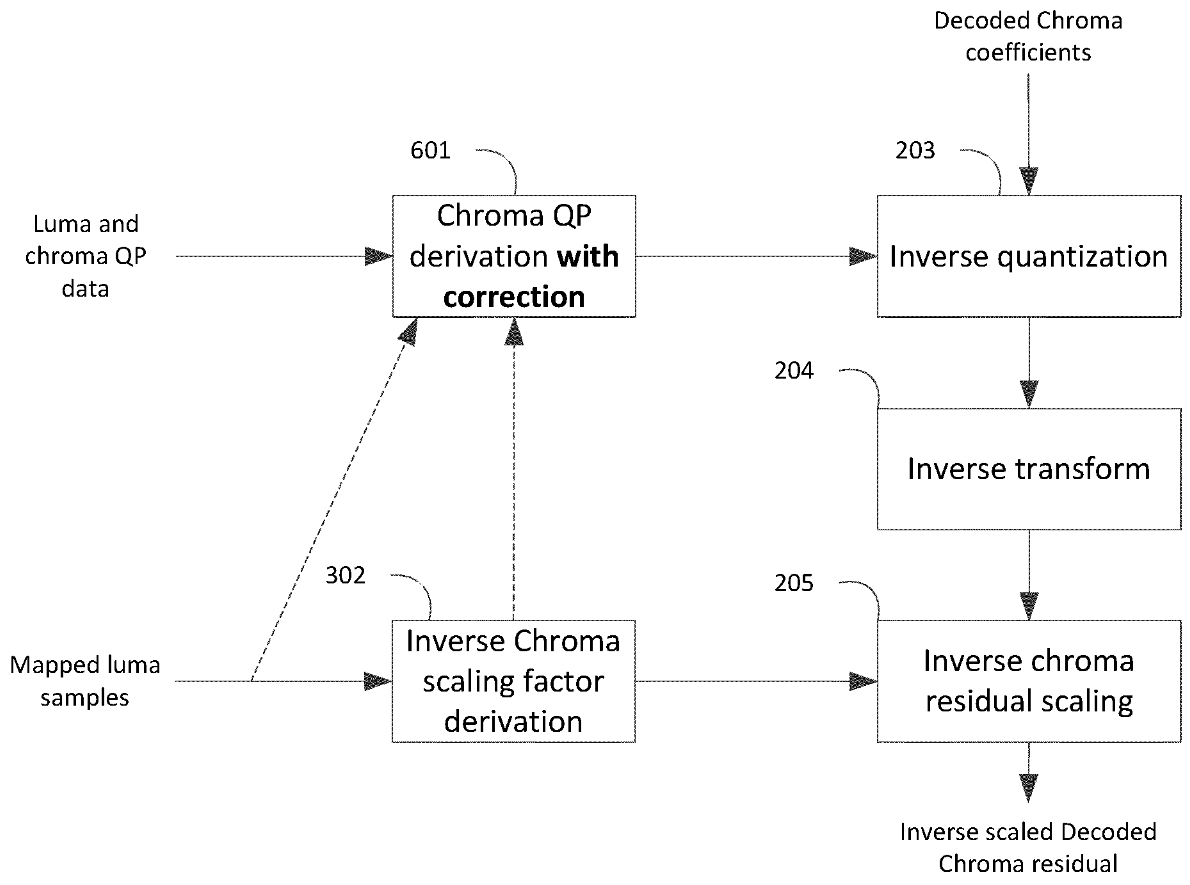
FIG. 8 illustrates an example of a modified inverse quantization and inverse scaling of chroma residual according to a general aspect of at least one embodiment.

In these embodiments, step 301 "chroma QP derivation" is modified/replaced by a step 601 of "chroma QP derivation with correction", as shown in FIG. 8. Information from the inverse chroma scaling factor derivation (e.g., 302 of FIG. 2) may be used in 601 of FIG. 8.

Example 1

In one exemplary embodiment, the value of QPY is corrected based on a value of the chroma residual scaling factor, or on a value depending on luma samples close to the relative location in the picture of the chroma samples, for instance, avgY.

Figure 9:
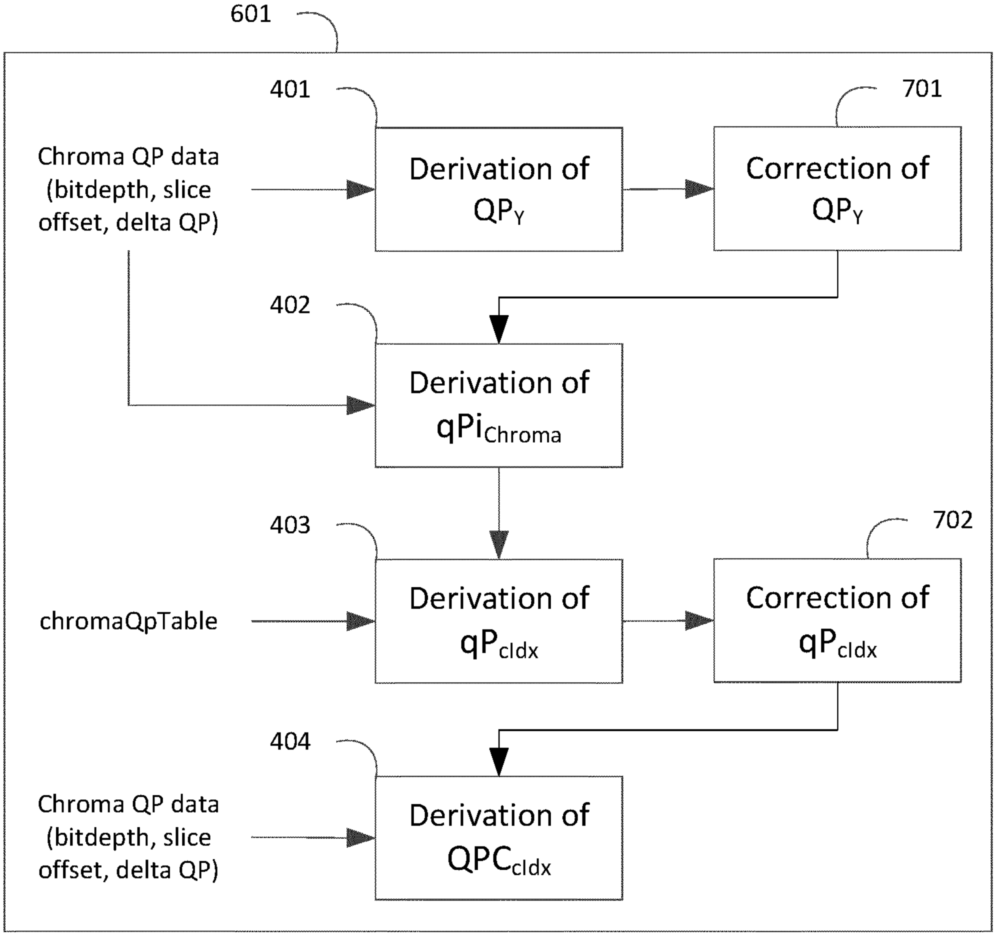
FIG. 9 illustrates an example of modified chroma QP derivation according to a general aspect of at least one embodiment.

The inverse quantization and inverse chroma residual scaling processes are achieved by the following steps, as illustrated in FIG. 9. Changes compared to the a previous version of VVC process are shown in underlined below.

Step 601:
Step 401: derivation of QPY.
Step 501 (see, e.g., FIG. 2): derivation of avgY
Step 502 (see, e.g., FIG. 2): derivation invScale
  invScale=chromaScale Table [idx (avgY)]
Correction step 701:
  QPY=f (QPY, invScale) or QPY=f (QPY, avgY)
  Examples of function f are shown below.
Step 402: derivation of $qP_{ic\text{-}roma}$
  $qPi_{Chroma}$=Clip3 (-QpBdOffsetc, 63, Qpy)
Step 403: derivation of $qP_{cldx}$
  $qP_{cldx}$=ChromaQpTable [cldx-1] [$qPi_{chroma}$]
Step 404: derivation of $QFC_{cldx}$
  $QPC_{cldx}$=Clip3 (--QpBdOffsetc, 63, $qP_{cldx}$ +pps_cb_qp_offset+slice_cb_qp_offset+CuQpOffsetcb)+QpBdOffsetc
Step 302 (see, e.g., FIG. 2):
Step 501: derivation of avgY
Step 502: derivation invScale
  invScale=chromaScale Table [idx (avgY)]

Examples of Function f

The expected effect of function f is to decrease the QP value when the Y values used to derive the CRS factor have been forward mapped using a forward mapping function slope larger than 1, or to increase the QP value when the Y values used to derive the CRS factor have been forward mapped using a forward mapping function slope ower than 1.

In an embodiment, the function f can be defined as follows:

f (Qp, avgY)=Qp-round (6*Log2 (fwpMappingSlope ($invMap_{fwd}$(avgY))))

where fwpMappingSlope (Y) corresponds to the slope of the luma forward mapping function at value Y, and $invMap_{fwd}$ corresponds to the function approximating the inverse of the function $Map_{fwd}$. For a value Y belonging to the $i^{th}$ range interval, Y in [$Y_i$, $Y_{i+1}$-1], fwpMappingSlope (Y) is equal to lumaMapTable [i]. Log2 (x) is the logarithmic function of base 2, round (x) is the nearest integer to x.

It should be also noted that in the VTM, fwpMappingSlope ($invMap_{fwd}$(avgY)) is equivalent to (1/chromaScale Table [idx (avgY)|), that is, (1/invScale).

Instead of using avgY, which is derived from luma samples neighboring the current VDPU, a luma representative value refValY of the luma samples collocated or close to the chroma block can be used instead. For instance,

- refValY is equal to the average value of the collocated luma samples of the chroma block, or of some of them (for instance 1 over 4, or the top-left sample of the collocated luma block, or the sample in the center of the collocated luma block); or.
- refValY is equal to the average value of the current VDPU luma samples, or of some of them (for instance, 1 over 4, or the top-left sample of the VDPU, or the sample in the center of the VDPU).

In an embodiment, the function f can be defined as follows:

f (Qp, refValY)=Qp-round (6*Log2 (fwpMappingSlope ($invMap_{fwd}$(refValY))))

In another embodiment, the function f is defined as follows:

f (Qp, invScale)=Qp-round (6*Log2 (1/invScale))=Qp+ round (6*Log2 (invScale))

Example 2

In another exemplary embodiment, the value of $qP_{cldx}$ is corrected based on the value of the chroma residual scaling factor, or on the value of avgY.

The inverse quantization and inverse chroma residual scaling processes are achieved by the following steps, also shown in FIG. 9:

Step 601:

Step 401: derivation of QpY

Step 501 (see, e.g., FIG. 2): derivation of avgY

Step 502 (see, e.g., FIG. 2): derivation invScale invScale=chromaScale Table [idx (avgY)]

Step 402: derivation of $qF_{ichroma}$ $qPi_{Chroma}$=Clip3 (-QpBdOffsetc, 63, Qpy)

Step 403: derivation of $qF_{cldx}$ $qP_{cldx}$=ChromaGpTable [cldx-1] [$qPi_{chroma}$]

correction step 702:

$gP_{cldx}$=f (@P cldx, invScale) or $qP_{cldx}$=f ($QP_{cldx}$, avgY)

Step 404: derivation of $QPC_{cldx}$ $QPC_{cldx}$=Clip3 (-QpBdOffsetc, 63, qP cldx +pps_cb_qp_offset+slice_cb_qp_offset+CuQpOff-setcb)+QpBdOffsetc Step 302 (see, e.g., FIG. 2):

Step 501: derivation of avgY

Step 502: derivation invScale invScale=chromaScaleTable [idx (avgY)]

Accordingly, FIG. 9 illustrates a modified process according to Example 1 or Example 2 above, with difference of one step, which is either step 701, or step 702. Only one of them should be used depending on the implementation choice.

Figure 10:
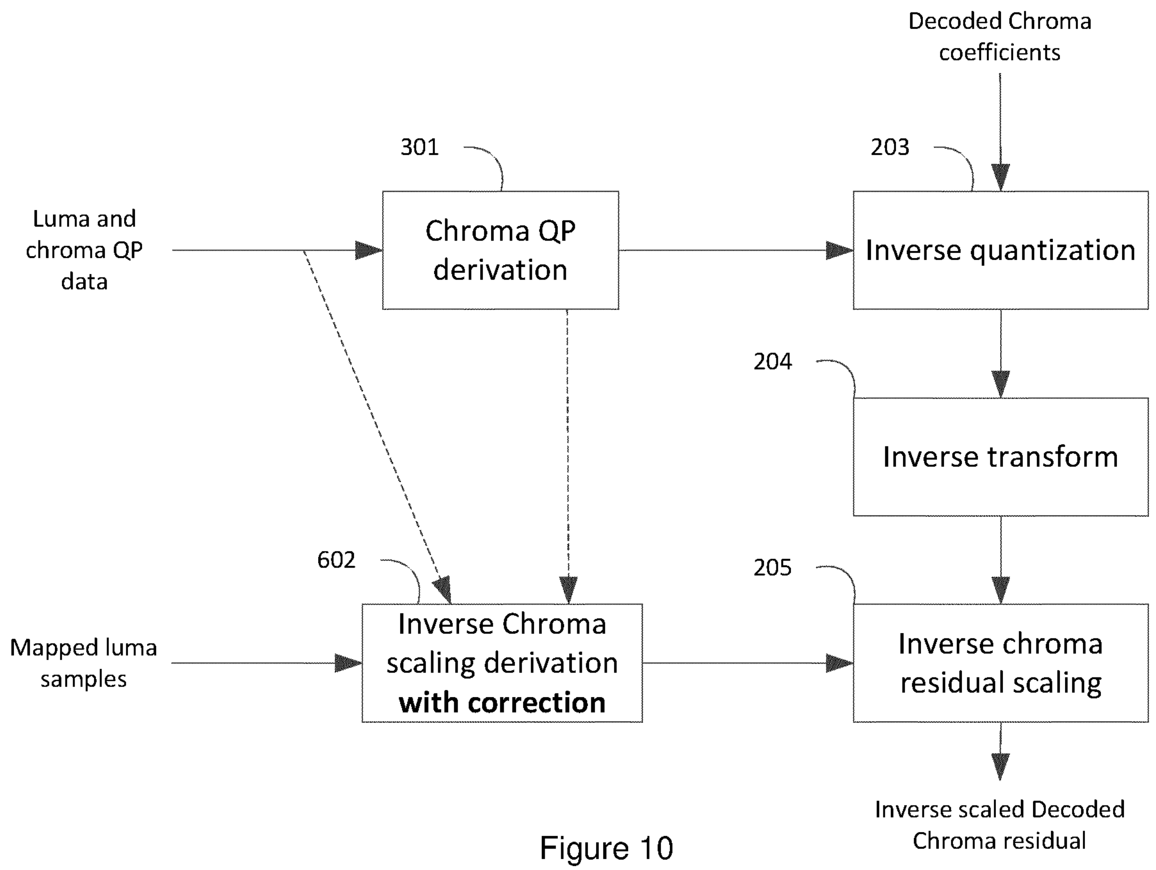
FIG. 10 illustrates an example of modified inverse quantization and inverse scaling of the chroma residual according to a general aspect of at least one embodiment.
Figure 11:
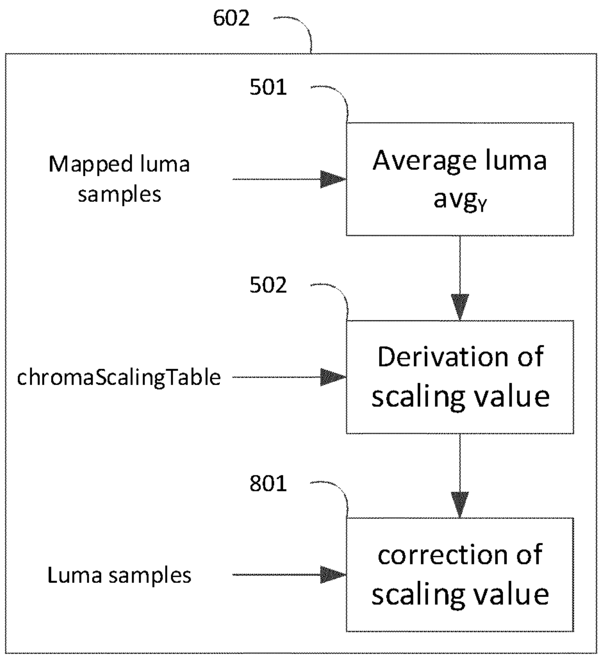
FIG. 11 illustrates an example of modified chroma scaling derivation according to a general aspect of at least one embodiment.

Embodiments—Correction Applied when Deriving the Chroma Residual Scaling Factor In these embodiments, step 302 of inverse chroma residual scaling derivation (e.g., in FIG. 2 and FIG. 8) is modified/replaced by a step 602 of inverse chroma residual scaling derivation with correction, as shown in FIG. 10 and FIG. 11.

Example 1

In one exemplary embodiment, the value of invScale is corrected based on the value of a luma QP value, noted $QP_{ref}$, that is not dependent on the luma QP used for the collocated luma samples of the chroma block.

For instance, $QP_{ref}$ is the luma QP defined for the slice, SliceQpy or for the tile or for the brick.

In another example, $QP_{ref}$ is derived from the luma QP of last luma block of the previous quantization group.

In another example, $QP_{ref}$ is derived from the luma QP values used for the luma samples used to derive the CRS inverse scaling value of the current VDPU.

In a variant, $QP_{ref}$ is selected at the encoder and coded in the stream, at SPS, PPS, APS, slice header, tile header, brick header or CTU level. It is then used to derive the scaling and inverse scaling factors at the encoder and at the cecoder.

$QP_{ref}$ can for example be set to the slice luma QP SliceQpy of the I-slice arising at each intra per od, with a pre-defined offset added:

$QP_{ref}$=SliceQpY+QPoffset

Typical values of QPoffset are from 0 to 5.

The inverse quantization and inverse chroma residual scaling processes are achieved by the following steps, as illustrated in FIG. 11. Changes compared to the a previous version of VVC process are shown in underlined below.

Step 301

Step 401: derivation of QPY

Step 402: derivation of $qPi_{chroma}$ $qPi_{Chroma}$=Clip3 (-QpBdOffsetc, 63, QPY)

Step 403: derivation of $qP_{cldx}$ $qP_{cldx}$=ChromaQpTable [cldx-1] [$qPi_{chroma}$]

Step 404: derivation of $QPC_{cldx}$ $QPC_{cldx}$=Clip3 (-QpBdOffsetc, 63, qP cldx +pps_cb_qp_offset+slice_cb_qp_offset+CuQpOff-setco)+QpBdOffsetc Step 602

Step 501: derivation of avgY

Step 502: derivation invScale invScale=chromaScaleTable [idx (avgY)]

Correction step 801:

invScale=invScale*g (invScale, $QP_{ref}$)

Examples of Function g

The construction of function g is based on the following reasoning.

$qP_{cldx}$ has been derived as:

qP cldx=ChromaQpTable [cldx-1] [QpY]

(If we Neglect the Effect of Clipping (Step 402).

However, the luma signal used for deriving the chroma scaling value has been forward mapped, which is equivalent to a scaling. Typically, the luma scaling can be approximated as fwpMappingSlope ($invMap_{fwd}$(avgY)) (which is equivalent to lumaMapTable [idx (avgY)]).

It means that Qpy should have been corrected as (Qpy-avgY), where dQpY=6*Log2 (fwpMappingSlope ($invMap_{fwd}$(avgY)))

≈6*Log2 (lumaMapTable [idx (avgY)])

that can also be approximated by (-6*Log2 (inScale)), since in VVC specification inScale=fwpMappingSlope ($invMap_{fwd}$(avgY)).

It also means that the true $qP_{cldx}$ should have been derived as (for sake of simplicity, the first table index related to the chroma component has been removed):

qP cldx=ChromaQpTable [Qpy-dQpY]

It means that instead of inverse quantizing the chroma signal by a factor proportional to:

2^(ChromaQpTable [QpY]/6)

the inverse quantizing factor should have been proportional to:

2^(ChromaQpTable [Qpr-dQpY]/6)

Consequently, the scaling factor should have been proportional to:

2^(ChromaQpTable [QpY-dQpY]/6)/2^(ChromaQpTable [QpY]/6)≈

2^((ChromaQpTable [Qpy-dQpY]-ChromaQpTable [QpY])/6)

Or equivalently, the inverse scaling factor should have been proportional to

2^((ChromaQpTable [Qpy]-ChromaQpTable [Qpy-dQpY])/6)

In an embodiment, the scaling/inverse scaling factors are explicitly set to the following values:

scale=2^((ChromaQpTable [QpY-round (dQpy)]-ChromaQpTable [QpY])/6)

invScale=2^((ChromaQp Table [QpY])/6-ChromaQpTable [Qpy-round (dQpY)]) The rounding is required because dQpy may be not an integer value.

In an alternate implementation, the factors are computed using linear interpolation, as follows:

Qp0=ChromaQpTable [Qpr-floor (dQpY)]

Qp1=ChromaQpTable [QpY-floor (dQpY)+1]

Frac=dQpY-floor (dQpY)

QPmodif=(1-Frac)*Qp0+Frac*Qp1 deltaQP=QPmodif-ChromaQpTable [QpY]

scale=2^(-deltaQP/6)

invScale=2^(deltaQP/6)

where floor (x) is the the largest integer less than or equal to x.

Approximations of these functions can be used.

For instance, considering the approximation:

ChromaQpTable [Qpr-dQpY] ≈ChromaQpTable [QpY]-dQpy*ChromaQpTable' [Qpy] where ChromaQpTable' is a function approximating the derivative of a function approximated by the Look-up-table ChromaQpTable, the scaling/inverse scaling factors are explicitly set to the following values:

invScale=2^(-dQpy*ChromaQpTable' [QpY]/6)

scale=2^(dQpy*ChromaQp Table' [QpY]/6)

Note that in case of ChromaQpTable' [QpY]=1, this leads to:

invScale=1/lumaMap Table [idx (avgY)]

scale=lumaMapTable [idx (avgY)]

which is the previous VTM way of deriving invScale and scale.

If it is considered that most of the time, QPY is relatively close to $QP_{ref}$, QPY can be replaced by $QP_{ref}$ which does not relate to collocated luma samples of the chroma block. This approximation can apply to the variants of function g described above.

In an embodiment, the function g is defined as follows:

g (invScale, $Qp_{ref}$)=2^((ChromaQpTable [$Qp_{ref}$-dQpY]-ChromaQpTable [$Qp_{ref}$])/6)

In an embodiment, dQpY=6*Log2 (lumaMapTable [idx (avgY)]

In an embodiment, dQpY=−6*Log2 (chromaScaleTable [idx (avgY)]

In another embodiment, the function g is defined as follows:

g (invScale, $Qp_{ref}$)=2^(-slopeChMapTable*dQpy/6)

where slopeChMapTable is a given parameter, for instance derived as:

slopeChMapTable=(chromaScale Table [QP1]-QP1)-(chromaScale Table [QP0]-QP0)/(QP1-QP0)

with for example QP0=20, QP1=50, or QP0=$Qp_{ref}$-K, QP1=$Qp_{ref}$+K, K being a pre-defined parameter.

In another embodiment, the function g is defined as follows:

g (invScale, $Qp_{ref}$)=lumaMap Table [idx (avgY)]^slopeChMap Table

If it is considered that invScale=chromaScaleTable [idx (avgY)]=1/lumaMap Table [idx (avgY)].

In another embodiment, steps 502 and 801 can be aggregated into one single step such that invScale=chromaScaleTable [idx (avgY)]^(1-slopeChMapTable)

In another embodiment, the correction is performed once to the complete chromaScaleTable. For instance, each element of the table is corrected as follows:

chromaScale Table [i]=cromaScaleTable [i]^(1-slopeChMapTable)

The block diagram of FIG. 11 depicts the modified block diagram 602 of FIG. 2, according to the above disclosed embodiments, with the addition of step 801 in FIG. 11.

In an embodiment, instead of using avgY in function g, a luma representative value refValY of the luma samples collocated or close to the chroma block may be used. For instance:

refValY is equal to the average value of the collocated luma samples of the chroma block, or of some of them (for instance 1 over 4, or the top-left sample of the collocated luma block, or the sample in the center of the collocated luma block); or.

refValY is equal to the average value of the current VDPU luma samples, or of some of them (for instance 1 over 4, or the top-left sample of the VDPU, or the sample in the center of the VDPU)

As there are possibly several chroma QP tables (one per chroma component), in an embodiment, one syntax element (e.g. named reference_qp_table_for_chroma) is signalled to indicate which of those tables is used to derive or correct the chroma scaling table. The syntax element can be for instance inserted in the SPS or in the slice header, and can take values 0 to 2. The processes described above apply using the chroma QP table ChromaQpTable [reference_qp_table_for_chroma].

Examples with Explicit Signaling of Correction Parameters of the Table chromaScaleTable In another embodiment, corrective parameters of the chroma scaling table chromaScaleTable are signalled in the bitstream. For instance, one to three corrective tables chromaScaleCorrectionTable [cldx-1] are signaled, of same size N as chromaScaleTable.

For each component cldx, a chroma scaling table table chromaScaleTable [cldx-1] is initialized in the same way as in VVC, based on the table lumaMapTable. For instance:

For i=0 to (N-1), chromaScale Table [cldx--1] [i]=1/lumaMapTable [i] when lumaMapTable [i] is different from 0 chromaScaleTable [cldx-1] [i]=1 when lumaMapTable [i] is equal to 0

The correction is performed as follows:

For i=0 to (N-1), chromaScaleTable [cldx-1] [i]=chromaScale Table [cldx-1] [i] *chromaScaleCorrection Table [cldx-1] [i]

In an embodiment, a high-level flag (chroma_res_scaling_correction_flag) is added to indicate if the correction is activated or not An example of new syntax, inserted at the slice level, is provided in Table 5 below. In this example, up to three correction tables are signaled, one for each chroma component. The syntax could also be inserted in a high-level structure such as the SPS, PPS, tile header, brick header, or APS.

TABLE 5

| | Descriptor |
|---|---|
| seq_parameter_set_rbsp( ) { | |
| ... | |
| chroma_res_scaling_correction_flag | |
| ... | |
| ... | |

TABLE 5-continued

| | Descriptor |
|---|---|
| slice_header( ) { | |
| ... | |
| } | |
| if(chroma_res_scaling_correction_flag != 0 ) { | |
|   same_crs_table_for_chroma | u(l) |
|   for( i = 0; i < same_crs_table_for_chroma ? 1 : 3; i++ ) { | |
|     num_points_in_correction_table_minus1[ i ] | ue(v) |
|     for( j = 0; j <= num_points_in_correction_table_minus1[ i ]; j++ ) { | |
|       chroma_res_scaling_correction_val[ i ][ j ] | ue(v) |
|     } | |
|   } | |
| } | |
| ... | |

Considering that chroma_res_scaling_correction_val [i] [j] is coded as an integer, and that a neutral value is equal to 2K, K being a predefined parameter, on K bits, chromaScaleCorrection Table [i] [j] may be derived or approximated as follows:

For i=0 to (N−1), chromaScaleCorrection Table [i] [j]=chroma_res_scaling_correction_val [i] [j]/2^K In an embodiment, same_crs_table_for_chroma is not signalled but inferred to be of same value as same_qp_table_for_chroma.

The semantics of the added syntax elements is provided below. lmcs_delta_crs_coded_flag equal to 0 specifies that the syntax elements lmcs_delta_crs_prec_minus1, lmcs_delta_abs_crs [i] and lmcs_delta_abs_crs [i], with i=lmcs_min_bin_idx. . . . LmcsMaxBinIdx, are not present. lmcs_delta_crs_coded_flag equal to 1 specifies that these syntax elements are present.

lmcs_delta_crs_prec_minus1 plus 1 specifies the number of bits used for the representation of the syntax lmcs_delta_abs_crs [i]. The value of lmcs_delta_crs_prec_minus1 shall be in the range of 0 to BitDepthY−2, inclusive. When lmcs_delta_crs_prec_minus1 is not present, it is set equal to 0. lmcs_delta_abs_crs [i] specifies the absolute codeword value for the $i^{th}$ correction value of the chroma residual scaling. When lmcs_delta_abs_crs [i] is not present, it is set equal to 0. lmcs_delta_sign_crs_flag [i] specifies the sign of the variable lmcsDeltaCrs [i]. When lmcs_delta_sign_crs_flag [i] is not present, it is set equal to 0.

The variable lmcsDeltaCrs [i], with i=lmcs_min_bin_idx. . . . LmcsMaxBinIdx, is derived as follows:

lmcsDeltaCrs [i]=(1−2*lmcs_delta_sign_crs_flag [i]) *lmcs_delta_abs_crs [i]

In addition, the following text from a version of WVC specification shall be modified (changes are underlined):

The variable ChromaScaleCoeff [i], with i=0 . . . 15, is derived as follows:

```
if ( lmcsCW[ i ] = = 0 )
    ChromaScaleCoeff[ i ] = (1 << 11)
else
    ChromaScaleCoeff[ i ] = OrgCW * (1 << 11) / ( lmcsCW[ i ] + lmcsDeltaCrs[ i ]
)
```

In an alternate embodiment, the correction values that are signalled in the stream are defined in the scaling domain, not in the inverse scaling domain. This advantageously enabling limiting the range of the coded values. An example of related syntax for coding the chroma residual coding correction table is provided below. New syntax compared to a version of WVC syntax is underlined in the structure lmcs_data ( ) contained in the APS

TABLE 6

| | Descriptor |
|---|---|
| lmcs_data ( ) { | |
|   lmcs_min_bin_idx | ue(v) |
|   lmcs_delta_max_bin_idx | ue(v) |
|   lmcs_delta_cw_prec_minus1 | ue(v) |
|   for ( i = lmcs_min_bin_idx; i <= LmcsMaxBinIdx; i++ ) { | |
|     lmcs_delta_abs_cw[ i ] | u(v) |
|     if (lmcs_delta_abs_cw[ i ] ) > 0 ) | |
|       lmcs_delta_sign_cw_flag[ i ] | u(l) |
|   } | |
|   lmcs_delta_crs_coded_flag | u(l) |
|   if (lmcs_delta_crs_coded_flag = = true ) { | |
|     lmcs_delta_crs_prec_minus1 | ue(v) |
|     for ( i = lmcs_min_bin_idx; i <= LmcsMaxBinIdx; i++ ) { | |
|       lmcs_delta_abs_crs[ i ] | u(v) |
|       if (lmcs_delta_abs_crs[ i ] ) > 0 ) | - |
|         lmcs_delta_sign_crs_flag[ i ] | u(l) |
|     } | |
|   } | |
| } | |

A constraint is set on the corrective value to avoid computation overflow as follows.

It is a requirement of bitstream conformance that (lmcsCW [i]+lmcsDeltaCrs [i]) is in the range of (OrgCW>>3) to (OrgCW<<3−1), inclusive.

It can be observed that the corrective term lmcsDeltaCrs [i] is added to the term lmcsCW [i], that corresponds in the VVC specification to the slope of the $i^{th}$ segment of the luma mapping function. OrgCW represents in the VVC specification the neutral value of scaling. lmcs_min_bin_idx, LmcsMaxBinIdx represent the minimum and maximum indexes for which the LMCS syntax elements related to the LMCS tables are signalled.

In a variant, in order to avoid signaling a corrective table made of multiple elements, and to limit its related coding cost, only one or two corrective parameters, applying to the CRS table, are signalled. For example, an offset value "offset" and a shrink value "shrink" are signalled (considered as a floating point value here, but in practical implementations, fixed-point representation would be used). The table is modified as follows using offset and shrink:

```
if ( lmcsCW[ i ] = = 0 )
  ChromaScaleCoeff[ i ] = (1 << 11)
else
  deltaCW = lmcsCW[ i ] − OrgCW
  deltaCW = ( deltaCW > 0 ) ? round( shrink * deltaCW + offset) : − round( −
shrink * deltaCW + offset)
  modifiedCW = OrgCW + deltaCW
  ChromaScaleCoeff[ i ] = OrgCW * (1 << 11) / modifiedCW
```

Alternatively, in yet another variant, the process is modified as follows (with the parameter offset denoted as ImcsDeltaCrs):

```
if ( lmcsCW[ i ] = = 0 )
  ChromaScaleCoeff[ i ] = (1 << 11)
else
  ChromaScaleCoeff[ i ] = OrgCW * (1 << 11) / (lmcsCW[ i ] + lmcsDeltaCrs)
```

The constraint set on the corrective value to avoid computation overflow is formulated as follows: It is a requirement of bitstream conformance that, when ImcsCW [i] is not equal to 0, (ImcsCW [i] +ImcsDeltaCrs) is in the range of (OrgCW>>3) to (OrgCW<<3-1), inclusive.

An additional constraint can be imposed to the range of ImcsDeltaCrs. For instance, ImcsDeltaCrs can be constrained to be in the range [−7, 7]. This results when e.g. OrgCW=64 to a scale range of (64-7)/64=0.890625 to (64+7)/64=1.109375. Over this range, the scaling can be controlled by the delta QP of chroma.

An example of syntax for the case of coding a single offset is depicted in the table below (new added syntax is underlined).

TABLE 7

| | Descriptor |
|---|---|
| lmcs_data ( ) { | |
| lmcs_min_bin_idx | ue(v) |
| lmcs_delta_max_bin_idx | ue(v) |
| lmcs_delta_cw_prec_minus1 | ue(v) |
| for ( i = lmcs_min_bin_idx; i <= LmcsMaxBinIdx; i++ ) { | |
| lmcs_delta_abs_cw[ i ] | u(v) |
| if ( lmcs_delta_abs_cw[ i ] ) > 0 ) | |
| lmcs_delta_sign_cw_flag[ i ] | u(1) |
| } | |
| lmcs_delta_abs_crs | u(3) |
| if ( lmcs_delta_abs_crs ) > 0 ) | - |
| lmcs_delta_sign_crs_flag | u(1) |
| } | |

An example of related semantics is provided below.

Imcs_delta_abs_crs specifies the absolute codeword value of the variable ImcsDeltaCrs. The value of Imcs_delta_abs_crs shall be in the range of 0 and 7, inclusive. When not present, Imcs_delta_abs_crs shall be set equal to 0.

Imcs_delta_sign_crs_flag specifies the sign of the variable ImcsDeltaCrs. When not present, Imcs_delta_sign_crs_flag shall be set equal to 0.

The variable ImcsDeltaCrs is derived as follows:

ImcsDeltaCrs=(1-2*Imcs_delta_sign_crs_flag)*Imcs_delta_abs_crs

It is a requirement of bitstream conformance that, when ImcsCW [i] is not equal to 0, (ImcsCW [i]+ImcsDeltaCrs) is in the range of (OrgCW>>3) to (OrgCW<<3-1), inclusive.

The variable ChromaScaleCoeff [i], with i=0 . . . 15, is derived as follows:

```
if ( lmcsCW[ i ] = = 0 )
  ChromaScaleCoeff[ i ] = (1 << 11)
else
  ChromaScaleCoeff[ i ] = OrgCW * (1 << 11) / ( lmcsCW[ i ] + lmcsDeltaCrs )
```

Figure 13:
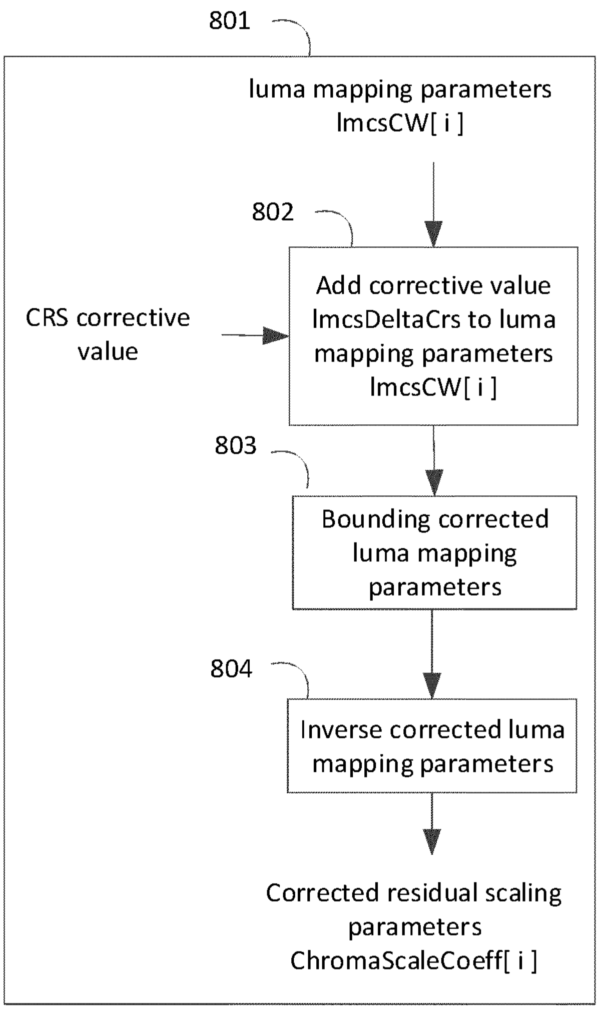
FIG. 13 illustrates an example of correction of chroma scaling in a chroma scaling derivation according to a general aspect of at least one embodiment.

The block diagram of FIG. 13 depicts another example of correction step 801 of chroma residual scaling parameters of FIG. 11, according to the above disclosed embodiments wherein a parameter offset denoted as ImcsDeltaCrs is used as corrective value of chroma residual scaling in the scaling domain.

In a step 802, the corrective value ImcsDeltaCrs of the one or more chroma residual scaling parameters is added to the luma mapping parameters ImcsCW [i] representative of the slope of the $i^{th}$ segment of the luma forward mapping function a luma forward mapping function applied to a prediction of luma samples. Step 802 results in resulting in corrected luma mapping slope values (ImcsCW [i]+ImcsDeltaCrs).

According to a particular variant, the offset parameter ImcsDeltaCrs is signalled in the stream, at any of SPS, PPS, APS, slice header, tile header, brick header or CTU level as other variant of corrective values (for instance $QP_{ref}$). Advantageously offset parameter ImcsDeltaCrs is signaled with LMCS parameters in the Adaptation Parameter Set APS.

According to another particular variant, in a step 803, the corrected luma mapping slope values are bounded to avoid computation overflow. For instance, when ImcsCW [i] is not equal to 0, a corrected luma mapping slope value (ImcsCW [i]+ImcsDeltaCrs) is in the range of (OrgCW>>3) to (OrgCW<<3-1), inclusive where OrgCW represents a neutral value of scaling.

In yet another variant, the offset parameter lmcsDeltaCrs in the range [−7, 7] since, as previously demonstrated, outside of this range, the granularity of the chroma residual scaling is controllable by the delta QP of chroma.

In a step 804, the chroma residual scaling parameters ChromaScaleCoeff [i] are derived by inverting the corrected luma mapping slope values as follows:

```
if ( lmcsCW[ i ] = = 0 )
  ChromaScaleCoeff[ i ] = (1 << 11)
else
  ChromaScaleCoeff[ i ] = OrgCW * (1 << 11) /
  ( lmcsCW[ i ] + lmcsDeltaCrs )
```

Then, as previously described with the encoding method of FIG. 6, the CRS processing 104 is applied to the chroma residuals, resulting the scaled chroma residuals to further process in the encoding method. Similarly, within an encoding or decoding method, an inverse CRS processing, 109 in FIG. 6 or 205 in FIG. 7, is applied to the decoded chroma residuals, to obtain the inverse scaled decoded chroma residuals with optimal accuracy. According to an embodiment, from the value avgY, the index idx in the chroma scaling parameters is computed. The avgY is derived from luma values that are in the forward mapped domain. Therefore, the index idx is computed as the value such that avgY belongs to the interval $[Map_{fwd}(Y_{idx}), Map_{fwd}(Y_{idx+1}-1)]$. The chroma prediction residual samples for all the chroma blocks in this VPDU are scaled by the scaling factor scale=(1/ChromaScaleCoeff [idx]) (at encoder) or inverse scaled by the scaling factor invScale=ChromaScaleCoeff [idx] (at decoder).

In a particular variant, steps 502 and 801 are aggregated into one single step such that invScale=OrgCW*(1<<11)/(lmcsCW [idx (avgY)]+lmcsDeltaCrs).

In another variant, the correction is performed once to the chroma residual scaling parameters resulting in ChromaScaleCoeff [i], followed by a derivation step:

invScale=ChromaScaleCoeff [idx (avgY)].

In yet another embodiment of the above process is as follows.

The initial generation of ChromaScaleCoeff [i] is unchanged compared to a version of VVC specification:

```
if ( lmcsCW[ i ] = = 0 )
  ChromaScaleCoeff[ i ] = (1 << 11)
else
  ChromaScaleCoeff[ i ] = ( OrgCW * (1 << 11) / lmcsCW[ i ] )
```

When applying the scaling of a chroma residual sample of a chroma block, the offset is added (the change compared to the version of VVC specification is underlined):

varScale=ChromaScaleCoeff [idxYInv]+lmcsDeltaCrs*K idxYInv being the index in the table ChromaScaleCoeff for the chroma block, derived as specified by the VVC specification, in the section 8.7.5.3 "Picture reconstruction with luma dependent chroma residual scaling process for chroma samples". K is a pre-defined value enabling to limit the number of bits B (bitdepth) needed to signal the offset parameter lmcsDeltaCrs.

Of course, this can be done by modifying the table ChromaScaleCoeff depending on the implementation, as follows.

ChromaScaleCoeff [i]=(OrgCW*(1<<11)/lmcsCW [i])+lmcsDeltaCrs*K

Preferably K is a power of 2. In this variant, recommended bitdepth for signaling lmcsDeltaCrs is B=8/Log2 (K) where Log2 (x) is the base-2 logarithm of x. In this variant the signaling is slightly modified as follows:

TABLE 8

| | |
|---|---|
| lmcs_delta_abs_crs | u(B) |
| if ( lmcs_delta_abs_crs ) > 0 ) | |
| lmcs_delta_sign_crs_flag | u(1) |

In a variant, the parameter lmcsDeltaCrs is a pre-defined value not signalled in the bitstream. For instance, lmcsDeltaCrs=3 in the variant applying the following formula:

ChromaScaleCoeff [i]=OrgCW*(1<<11)/(lmcsCW [i]+lmcsDeltaCrs)

Here the process is described considering floating-point computations. Its adaptation for integer/fixed-point computations is straightforward and is not described.

This process is applied both at the encoder and decoder sides. Additionally, before the last operation above, modifiedCW can be clipped between (OrgCW>>3) to (OrgCW<<3-1), inclusive.

The description above relates to the derivation of the chroma residual inverse scaling factor or scale. The chroma residual scaling factor used at the encoder to scale the chroma residual is the inverse of the chroma residual inverse scaling factor used at the decoder (invScale). Therefore, its derivation is straightforward (scale=1/invScale).

Figure 12:
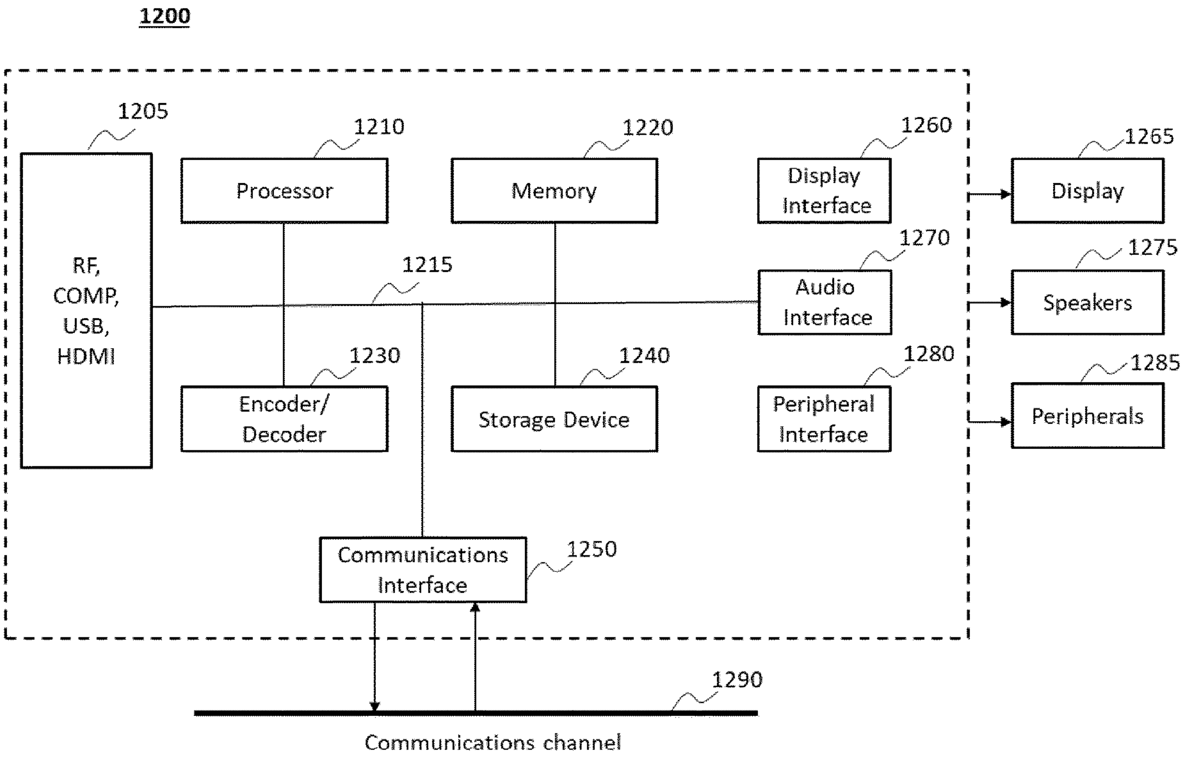
FIG. 12 illustrates a block diagram of a system within aspects of the present embodiments may be implemented.

FIG. 12 illustrates a block diagram of an example of a system 1200 in which various aspects and embodiments are implemented. System 1200 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1200, singly or in combination, can be embodied in a single integrated circuit, multiple ICs, and/or discrete components. For example, in at least one embodiment, the processing and encoder/decoder elements of system 1200 are distributed across multiple ICs and/or discrete components. In various embodiments, the system 1200 is communicatively coupled to other similar systems, or to other electronic devices, via, for example, a communications bus or through dedicated input and/or output ports. In various embodiments, the system 1200 is configured to implement one or more of the aspects described in this document.

The system 1200 includes at least one processor 1210 configured to execute instructions loaded therein for implementing, for example, the various aspects described in this document. Processor 1210 can include embedded memory, input output interface, and various other circuitries as known in the art. The system 1200 includes at least one memory 1220 (e.g., a volatile memory device, and/or a non-volatile memory device). System 1200 includes a storage device 1240, which can include non-volatile memory and/or volatile memory, including, but not limited to, EEPROM, ROM, PROM, RAM, DRAM, SRAM, flash, magnetic disk drive, and/or optical disk drive. The storage device 1240 can include an internal storage device, an attached storage device, and/or a network accessible storage device, as non-limiting examples.

System 1200 includes an encoder/decoder module 1230 configured, for example, to process data to provide an encoded video or decoded video, and the encoder/decoder module 1230 can include its own processor and memory. The encoder/decoder module 1230 represents module(s) that can be included in a device to perform the encoding and/or decoding functions. As is known, a device can include one or both of the encoding and decoding modules. Additionally, encoder/decoder module 1230 can be implemented as a separate element of system 1200 or can be incorporated within processor 1210 as a combination of hardware and software as known to those skilled in the art.

Program code to be loaded onto processor 1210 or encoder/decoder 1230 to perform the various aspects described in this document can be stored in storage device 1240 and subsequently loaded onto memory 1220 for execution by processor 1210. In accordance with various embodiments, one or more of processor 1210, memory 1220, storage device 1240, and encoder/decoder module 1230 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1210 and/or the encoder/decoder module 1230 is used to store instructions and to provide working memory for processing that is needed during encoding or decoding. In other embodiments, however, a memory external to the processing device (for example, the processing device can be either the processor 1210 or the encoder/decoder module 1230) is used for one or more of these functions. The external memory can be the memory 1220 and/or the storage device 1240, for example, a dynamic volatile memory and/or a non-volatile flash memory. In several embodiments, an external non-volatile flash memory is used to store the operating system of a television. In at least one embodiment, a fast, external dynamic volatile memory such as a RAM is used as working memory for video coding and decoding operations, such as for MPEG-2, HEVC, or VVC (Versatile Video Coding).

The input to the elements of system 1200 can be provided through various input devices as indicated in block 1205. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1205 have associated respective input processing elements as known in the art. For example, the RF portion can be associated with elements necessary for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1200 to other electronic devices across USB and/or HDMI connections. It is to be understood that various aspects of input processing, for example, Reed-Solomon error correction, can be implemented, for example, within a separate input processing IC or within processor 1210 as necessary. Similarly, aspects of USB or HDMI interface processing can be implemented within separate interface ICs or within processor 1210 as necessary. The demodulated, error corrected, and demultiplexed stream is provided to various processing elements, including, for example, processor 1210, and encoder/decoder 1230 operating in combination with the memory and storage elements to process the datastream as necessary for presentation on an output device.

Various elements of system 1200 can be provided within an integrated housing. Within the integrated housing, the various elements can be interconnected and transmit data therebetween using suitable connection arrangement 1140, for example, an internal bus as known in the art, including the 12C bus, wiring, and printed circuit boards.

The system 1200 includes communication interface 1250 that enables communication with other devices via communication channel 1260. The communication interface 1250 can include, but is not limited to, a transceiver configured to transmit and to receive data over communication channel 1260. The communication interface 1250 can include, but is not limited to, a modem or network card and the communication channel 1260 can be implemented, for example, within a wired and/or a wireless medium.

Data is streamed to the system 1200, in various embodiments, using a Wi-Fi network such as IEEE 802.11. The Wi-Fi signal of these embodiments is received over the communications channel 1260 and the communications interface 1250 which are adapted for Wi-Fi communications. The communications channel 1260 of these embodiments is typically connected to an access point or router that provides access to outside networks including the Internet for allowing streaming applications and other over-the-top communications. Other embodiments provide streamed data to the system 1200 using a set-top box that delivers the data over the HDMI connection of the input block 1205. Still other embodiments provide streamed data to the system 1200 using the RF connection of the input block 1205.

The system 1200 can provide an output signal to various output devices, including a display 1265, speakers 1275, and other peripheral devices 1285. The other peripheral devices 1285 include, in various examples of embodiments, one or more of a stand-alone DVR, a disk player, a stereo system, a lighting system, and other devices that provide a function based on the output of the system 1200. In various embodiments, control signals are communicated between the system 1200 and the display 1265, speakers 1275, or other peripheral devices 1285 using signaling such as AV.Link, CEC, or other communications protocols that enable device-to-device control with or without user intervention. The output devices can be communicatively coupled to system 1200 via dedicated connections through respective interfaces 1260, 1270, and 1280. Alternatively, the output devices can be connected to system 1200 using the communications channel 1290 via the communications interface 1250. The display 1265 and speakers 1275 can be integrated in a single unit with the other components of system 1200 in an electronic device, for example, a television. In various embodiments, the display interface 1260 includes a display driver, for example, a timing controller (T Con) chip.

The display 1265 and speaker 1275 can alternatively be separate from one or more of the other components, for example, if the RF portion of input 1205 is part of a separate set-top box. In various embodiments in which the display 1265 and speakers 1275 are external components, the output signal can be provided via dedicated output connections, including, for example, HDMI ports, USB ports, or COMP outputs.

The embodiments car be carried out by computer software implemented by the processor 1210 or by hardware, or by a combination of hardware and software. As a non-limiting example, the embodiments can be implemented by one or more integrated circuits. The memory 1220 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1210 can be of any type appropriate to the technical environment, and can encompass one or more of microprocessors, general purpose computers, spec al purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information can include one or more of, for example, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination. Various other generalized, as well as particularized, aspects, embodiments and claims are also supported and contemplated throughout this disclosure. For example, various methods and other aspects described in this application can be used to modify modules, for example, chroma residual scaling module 104 and inverse chroma residual scaling module 109 of a video encoder 100 in FIG. 6, and inverse chroma scaling module 205 of decoder 200 in FIG. 7. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

The invention claimed is:

1. A method comprising:

determining one or more chroma residual scaling parameters based on one or more luma mapping parameters and based on a corrective value of the one or more chroma residual scaling parameters, wherein the one or more luma mapping parameters are representative of a slope of a luma forward mapping function applied to a prediction of luma samples, and wherein the corrective value of the one or more chroma residual scaling parameters is an additive value to be added to the one or more luma mapping parameters to modify the slope of the luma forward mapping function; and encoding the video based on the determined one or more chroma residual scaling parameters.

2. The method of claim 1, wherein said corrective value of the one or more chroma residual scaling parameters is signaled as adaptive parameter in an Adaptation Parameter Set (APS).

3. The method of claim 1, wherein the chroma residual scaling parameters are derived by inverting corrected luma mapping slope values resulting from adding the corrective value of the one or more chroma residual scaling parameters to the one or more luma mapping parameters.

4. The method of claim 3, wherein the corrective value of the one or more chroma residual scaling parameters is in a range [−7, 7].

5. The method of claim 4, wherein the corrected luma mapping slope values are bounded.

6. A method comprising:

determining one or more chroma residual scaling parameters based on one or more luma mapping parameters and based on a corrective value of the one or more chroma residual scaling parameters, wherein the one or more luma mapping parameters are representative of a slope of a luma forward mapping function applied to a prediction of luma samples and wherein the corrective value of the one or more chroma residual scaling parameters is an additive value to be added to the one or more luma mapping parameters to modify the slope of the luma forward mapping function; and decoding the video based on the determined one or more chroma residual scaling parameters.

7. The method of claim 6, wherein said corrective value of the one or more chroma residual scaling parameters is signaled as adaptive parameter in an Adaptation Parameter Set (APS).

8. The method of claim 6, wherein the chroma residual scaling parameters are derived by inverting corrected luma mapping slope values resulting from adding the corrective value of the one or more chroma residual scaling parameters to the one or more luma mapping parameters.

9. The method of claim 8, wherein the corrective value of the one or more chroma residual scaling parameters is in a range [−7, 7].

10. The method of claim 9, wherein the corrected luma mapping slope values are bounded.

11. An apparatus comprising one or more processors, wherein the one or more processors are configured to:

determine one or more chroma residual scaling parameters based on one or more luma mapping parameters and based on a corrective value of the one or more chroma residual scaling parameters, wherein the one or more luma mapping parameters are representative of a slope of a luma forward mapping function applied to a prediction of luma samples and wherein the corrective value of the one or more chroma residual scaling parameters is an additive value to be added to the one or more luma mapping parameters to modify the slope of the luma forward mapping function; and encode the video based on the determined one or more chroma residual scaling parameters.

12. The apparatus of claim 11, wherein said corrective value of the one or more chroma residual scaling parameters is signaled as adaptive parameter in an Adaptation Parameter Set (APS).

13. The apparatus of claim 11, wherein the chroma residual scaling parameters are derived by inverting corrected luma mapping slope values resulting from adding the corrective value of the one or more chroma residual scaling parameters to the one or more luma mapping parameters.

14. The apparatus of claim 13, wherein the corrective value of the one or more chroma residual scaling parameters is in a range [−7, 7].

15. The apparatus of claim 14, wherein the corrected luma mapping slope values are bounded.

16. An apparatus comprising one or more processors, wherein the one or more processors are configured to:

determine one or more chroma residual scaling parameters based on one or more luma mapping parameters and based on a corrective value of the one or more chroma residual scaling parameters, wherein the one or more luma mapping parameters are representative of a slope of a luma forward mapping function applied to a prediction of luma samples and wherein the corrective value of the one or more chroma residual scaling parameters is an additive value to be added to the one or more luma mapping parameters to modify the slope of the luma forward mapping function; and decode the video based on the determined one or more chroma residual scaling parameters.

17. The apparatus of claim 16, wherein said corrective value of the one or more chroma residual scaling parameters is signaled as adaptive parameter in an Adaptation Parameter Set (APS).

18. The apparatus of claim 16, wherein the chroma residual scaling parameters are derived by inverting corrected luma mapping slope values resulting from adding the corrective value of the one or more chroma residual scaling parameters to the one or more luma mapping parameters.

19. The apparatus of claim 18, wherein the corrective value of the one or more chroma residual scaling parameters is in a range [−7, 7].

20. The apparatus of claim 19, wherein the corrected luma mapping slope values are bounded.

21. A non-transitory computer readable medium having stored instructions which, when executed by one or more processors, cause the one or more processors to perform a method using a corrective value for one or more chroma residual scaling parameters, the non-transitory computer readable medium further comprising containing data content encoded thereupon, comprising:

a coded block;

one or more luma mapping parameters representative of a slope of a luma forward mapping function applied to a prediction of luma samples of the coded block; and the corrective value for one or more chroma residual scaling parameters, wherein the corrective value of the one or more chroma residual scaling parameters is an additive value to be added to the one or more luma mapping parameters to modify the slope of the luma forward mapping function to produce chroma residual scaling parameters representative of a chroma scaling function applied to a prediction of chroma samples of the coded block.

* * * * *